United States Patent
Leupold et al.

(10) Patent No.: US 9,612,826 B2
(45) Date of Patent: Apr. 4, 2017

(54) ATTRIBUTING AUTHORSHIP TO SEGMENTS OF SOURCE CODE

(71) Applicant: Facebook, Inc., Menlo Park, CA (US)

(72) Inventors: Felix Leupold, Berlin (DE); Matt Maclean, Newmarket (CA); Lucas Moscovicz, Buenos Aires (AR); Conrado Mader Blanco, Buenos Aires (AR); Adrien Conrath, Sceaux (FR)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 14/448,723

(22) Filed: Jul. 31, 2014

(65) Prior Publication Data

US 2016/0034273 A1 Feb. 4, 2016

(51) Int. Cl.
*G06F 9/44* (2006.01)

(52) U.S. Cl.
CPC ...................... *G06F 8/71* (2013.01)

(58) Field of Classification Search
None
See application file for complete search history.

(56) References Cited

U.S. PATENT DOCUMENTS

| | | | | |
|---|---|---|---|---|
| 5,428,729 A * | 6/1995 | Chang et al. | ................. | 715/751 |
| 6,275,223 B1 * | 8/2001 | Hughes | ................. | G06F 3/0483 |
| | | | | 715/751 |
| 6,324,498 B1 * | 11/2001 | Wajda | ............................. | 703/25 |
| 7,503,035 B2 * | 3/2009 | Zeidman | ....................... | 717/123 |
| 7,818,678 B2 * | 10/2010 | Massand | ............ | G06F 17/2229 |
| | | | | 715/751 |
| 8,021,163 B2 * | 9/2011 | Forman | ........................ | 434/322 |
| 8,341,600 B2 * | 12/2012 | Sutherland et al. | .......... | 717/126 |
| 8,990,764 B2 * | 3/2015 | Armstrong | ............... | G06F 8/30 |
| | | | | 717/100 |
| 9,105,007 B2 * | 8/2015 | Massand | ............ | G06F 17/2229 |
| 9,111,093 B1 * | 8/2015 | Terribilini | ............... | G06F 17/27 |

(Continued)

OTHER PUBLICATIONS

Taylor, Quinn C., et al. "An analysis of author contribution patterns in eclipse foundation project source code." Open Source Systems: Grounding Research. Springer Berlin Heidelberg, 2011. 269-281.*

(Continued)

*Primary Examiner* — Matthew Brophy
(74) *Attorney, Agent, or Firm* — Morgan, Lewis & Bockius LLP

(57) ABSTRACT

An electronic device accesses a comparison of at least a portion of a second version of a software program to a corresponding portion of a first version of the software program. The device determines an attribution value for a first author based in part on one or more differences between a respective segment of source code in the second version of the software and a corresponding segment of source code in the first version of the software, and determines an attribution value for a second author based in part on one or more differences between the respective segment of source code in the second version of the software and the corresponding segment of source code in the first version of the software. The device displays or sends instructions for displaying indicia of at least one attribution value with the respective segment of source code in the second version.

20 Claims, 23 Drawing Sheets

(56) References Cited

U.S. PATENT DOCUMENTS

| | | | | |
|---|---|---|---|---|
| 9,207,933 B2* | 12/2015 | Bostick | | G06F 8/71 |
| 9,311,056 B2* | 4/2016 | Armstrong | | G06F 8/30 |
| 2002/0143522 A1* | 10/2002 | Storisteanu et al. | | 704/1 |
| 2003/0131313 A1* | 7/2003 | Flanagan | | G06Q 10/10 |
| | | | | 715/210 |
| 2005/0108686 A1* | 5/2005 | White | | 717/124 |
| 2006/0080336 A1* | 4/2006 | Zhang et al. | | 707/100 |
| 2007/0168946 A1* | 7/2007 | Drissi et al. | | 717/110 |
| 2008/0086718 A1* | 4/2008 | Bostick et al. | | 717/120 |
| 2009/0210855 A1* | 8/2009 | Ramanathan | | 717/102 |
| 2010/0211932 A1* | 8/2010 | Jones | | G06F 11/3624 |
| | | | | 717/124 |
| 2011/0055799 A1* | 3/2011 | Kaulgud et al. | | 717/101 |
| 2011/0125798 A1* | 5/2011 | Misch et al. | | 707/785 |
| 2012/0036492 A1* | 2/2012 | Armstrong et al. | | 717/100 |
| 2013/0212562 A1* | 8/2013 | Fox et al. | | 717/120 |
| 2014/0047413 A1* | 2/2014 | Sheive et al. | | 717/110 |
| 2014/0173561 A1* | 6/2014 | Toub | | 717/123 |
| 2015/0046904 A1* | 2/2015 | Rummler et al. | | 717/122 |

OTHER PUBLICATIONS

Mockus, Audris, and James D. Herbsleb. "Expertise browser: a quantitative approach to identifying expertise." Proceedings of the 24th international conference on software engineering. ACM, 2002.*

Fritz, Thomas, et al. "A degree-of-knowledge model to capture source code familiarity." Proceedings of the 32nd ACM/IEEE International Conference on Software Engineering—vol. 1. ACM, 2010.*

Medynskiy, Yevgeniy Eugene, Nicolas Ducheneaut, and Ayman Farahat. "Using hybrid networks for the analysis of online software development communities." Proceedings of the SIGCHI conference on Human Factors in computing systems. ACM, 2006.*

Frantzeskou, Georgia, et al. "Effective identification of source code authors using byte-level information." Proceedings of the 28th international conference on Software engineering. ACM, 2006.*

18.10 Diff Mode, Misc File Ops, downloaded Apr. 8, 2014, 3pgs.

Wikipedia, "Diff," Wikipedia, the free encyclopedia, http://en.wikipedia.org/wiki/diff Jan. 16, 2014, 11 pgs.

Using Git Blame to Trace Changes in a File, GitHub Help, Mar. 26, 2014, downloaded from https://help.github.com/articles/using-git-blame-to-trace-changes-in-a-file , 2 pgs.

Phabricator, Wikipedia, modified Dec. 5, 2013, downloaded from http://en.wikipedia.org/wiki/Phabricator, 2 pgs.

Git (Software), Wikipedia, last modified on Jul. 22, 2014, downloaded from http://en.wikipedia.org/wiki/Git_(software), 10 pgs.

Mercurial, Wikipedia, last modified on Apr. 3, 2014, downloaded from http://en.wikipedia.org/wiki/Mercurial, 4 pgs.

Apache Subversion, Wikipedia, last modified on Oct. 20, 2000, downloaded from http://en.wikipedia.org/wiki/Apache_Subversion, 8 pgs.

Meet Phabricator, The Wity Code Review Tool Built Inside Facebook, Posted Aug. 7, 2011 by Alexia Tsotsis, downloaded from http://techcrunch.com/2011/08/07/oh-what-noble-scribe-hath-penned-these-words/, 6 pgs.

Revision Control, Wikipedia, last modified Jul. 13, 2014, downloaded from http://en.wikipedia.org/wiki/Revision_control, 8 pgs.

Change Impact Graphs: Determining the Impact of Prior Code Changes, German, D.M. et al., Preprint submitted to Elsevier on Mar. 16, 2009, downloaded from http://turingmachine.org/~dmg/papers/dmg2009_jist_changeImpactGraphs.pdf, 15 pgs.

List of Revision Control Software, Wikipedia, last modified on Jul. 17, 2014, downloaded from http://en.wikipedia.org/wiki/List_of_revision_control_software, 4 pgs.

Comparison of Revision Control Software, Wikipedia, last modified on Dec. 4, 2013, downloaded from http://en.wikipedia.org/wiki/Comparison_of_revision_control_software, 16 pgs.

Token, TechTerms.com, Apr. 9, 2009, http://www.techterms.com/definition/token, 1 pg.

Tokens and Java Programs, Jul. 2014, http://www.cs.cmu.edu/~pattis/15-1XX/15-200/lectures/tokens/lecture.html, 12 pgs.

Building Blocks of a Program, OSdata.com, last updated: Oct. 3, 2010, http://www.osdata.com/programming/basicstuff/buildingblocks.html, 3 pgs.

Foundations of IT, by Dhiraj Sharma, p. 114, First Edition 2008, http://books.google.com/books?id=M7PIVPmYoXoC&pg=PA114&lpg=PA114&dq=token+identifiers+operators+separators+reserved+words&source=bl&ots=RmWQOV1ers&sig=oPPmwzHmmBCXLWgdeKuApzZ08L4&hl=en&sa=X&ei=1vI1U53rKrGyygGv14CABA&ved=0CEAQ6AEwBA#v=onepage&q=token%20identifiers%20operators%20separators%20reserved%20words&f=false, 2 pgs.

Diff, Wikipedia, last modified on Jul. 24, 2014, http://en.wikipedia.org/wiki/Diff, 9 pgs.

Comparing and Merging Files, Diff Output Formats, Oct. 2, 2013, http://www.chemie.fu-berlin.de/chemnet/use/info/diff/diff_3.html, 16 pgs.

How to read a patch or diff and understand its structure to apply it manually, Oct. 30, 2011, http://www.markusbe.com/2009/12/how-to-read-a-patch-or-diff-and-understand-its-structure-to-apply-it-manually/ 5 pgs.

* cited by examiner

```
600-1

┌─604
X (100%)                  void w_mark_dead(pid_t pid)
X (100%)                  {
X (100%)                      w_root_t *root = NULL;
X (100%)                      w_ht_itr;
X (100%)
X (25%), Y (75%)              pthread_mutex_lock(&spawn_lock);
X (25%), Y (75%)              root = (w_root_t*)w_ht_get(running_kids, pid);
X (25%), Y (75%)              if (!root) {
X (25%), Y (75%)                  pthread_mutex_unlock(&spawn_lock);
X (25%), Y (75%)                  return;
X (25%), Y (75%)              }
X (100%)                      w_ht_del(running_kids, pid);
X (100%)
X (100%)                      /* now walk the cmds and try to find our match */
X (100%)                      w_root_lock(root);
                              // [...]
                              ...

Portion of Second
                              Version of Software
                                    Program ┌─602
X (100%)     void w_mark_dead(pid_t pid)
X (100%)     {
X (100%)         w_root_t *root = NULL;
X (100%)         w_ht_itr;
X (100%)
X (100%)         // TODO: lock spawn_lock
X (100%)         root = (w_root_t*)w_ht_get(running_kids, pid);
X (100%)         w_ht_del(running_kids, pid);
X (100%)
X (100%)         /* now walk the cmds and try to find our match */
X (100%)         w_root_lock(root);
                 // [...]
                 ...

Portion of First
                 Version of Software
                       Program
```

ATTRIBUTING AUTHORSHIP TO SEGMENTS OF SOURCE CODE

TECHNICAL FIELD

This relates generally to computer programming, including but not limited to revision control software.

BACKGROUND

A software program is often written and revised by multiple authors. Different programmers will work on the same software program, with each programmer creating new source code or removing or otherwise modifying portions of existing source code.

For a large software program that is developed and revised over weeks, months, or years, it is difficult to know or keep track of which programmers/authors are knowledgeable about particular segments of the source code (e.g., particular lines, blocks, paragraphs, functions, methods, or classes in the source code).

SUMMARY

Accordingly, there is a need for devices with methods and interfaces for attributing authorship to segments of source code. Keeping track of which programmer(s)/author(s) are responsible for particular segments of source code as the source code changes can help troubleshoot those segments and allows further improvements to the software program to be made in a more efficient manner.

In accordance with some embodiments, a method is performed at an electronic device with one or more processors and memory. The method includes: accessing a comparison of at least a portion of a second version of a software program to a corresponding portion of a first version of the software program. The first version of the software program was written by a first author. The portion of the second version of the software program includes revisions to the corresponding portion of the first version of the software program, the revisions including segments of source code in the second version of the software program that have changed relative to corresponding segments of source code in the first version of the software program. The revisions to the corresponding portion of the first version of the software program were written by a second author. The method further includes, for a respective segment of source code in the second version of the software program that has changed relative to a corresponding segment of source code in the first version of the software program: determining an attribution value for the first author based in part on one or more differences between the respective segment of source code in the second version of the software and the corresponding segment of source code in the first version of the software; and determining an attribution value for the second author based in part on one or more differences between the respective segment of source code in the portion of the second version of the software and the corresponding segment of source code in the first version of the software. The method further includes displaying or sending instructions for displaying at least some of the second version of the software program such that, for the respective segment of source code in the portion of the second version of the software program that has changed, at least one of an indicium of the attribution value for the first author and an indicium of the attribution value for the second author are displayed with the respective segment of source code in the portion of the second version of the software program.

In accordance with some embodiments, an electronic device includes an optional display, one or more processors, memory, and one or more programs; the one or more programs are stored in the memory and configured to be executed by the one or more processors and the one or more programs include instructions for performing the operations of the method described above. In accordance with some embodiments, a graphical user interface on an electronic device with a display, a memory, and one or more processors to execute one or more programs stored in the memory includes one or more of the elements displayed in the method described above, which are updated in response to inputs, as described in the method described above. In accordance with some embodiments, a computer readable storage medium has stored therein instructions which when executed by an electronic device with an optional display, and one or more processors, cause the device to perform the operations of the method described above. In accordance with some embodiments, an electronic device includes an optional display and means for performing the operations of the method described above.

Thus, electronic devices are provided with methods and interfaces for attributing authorship to segments of source code.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 4A-4G, 5A-5B, 6A-6B, and 7A-7B illustrate exemplary user interfaces for attributing authorship to segments of source code, in accordance with some embodiments.

DESCRIPTION OF EMBODIMENTS

Figure 1:
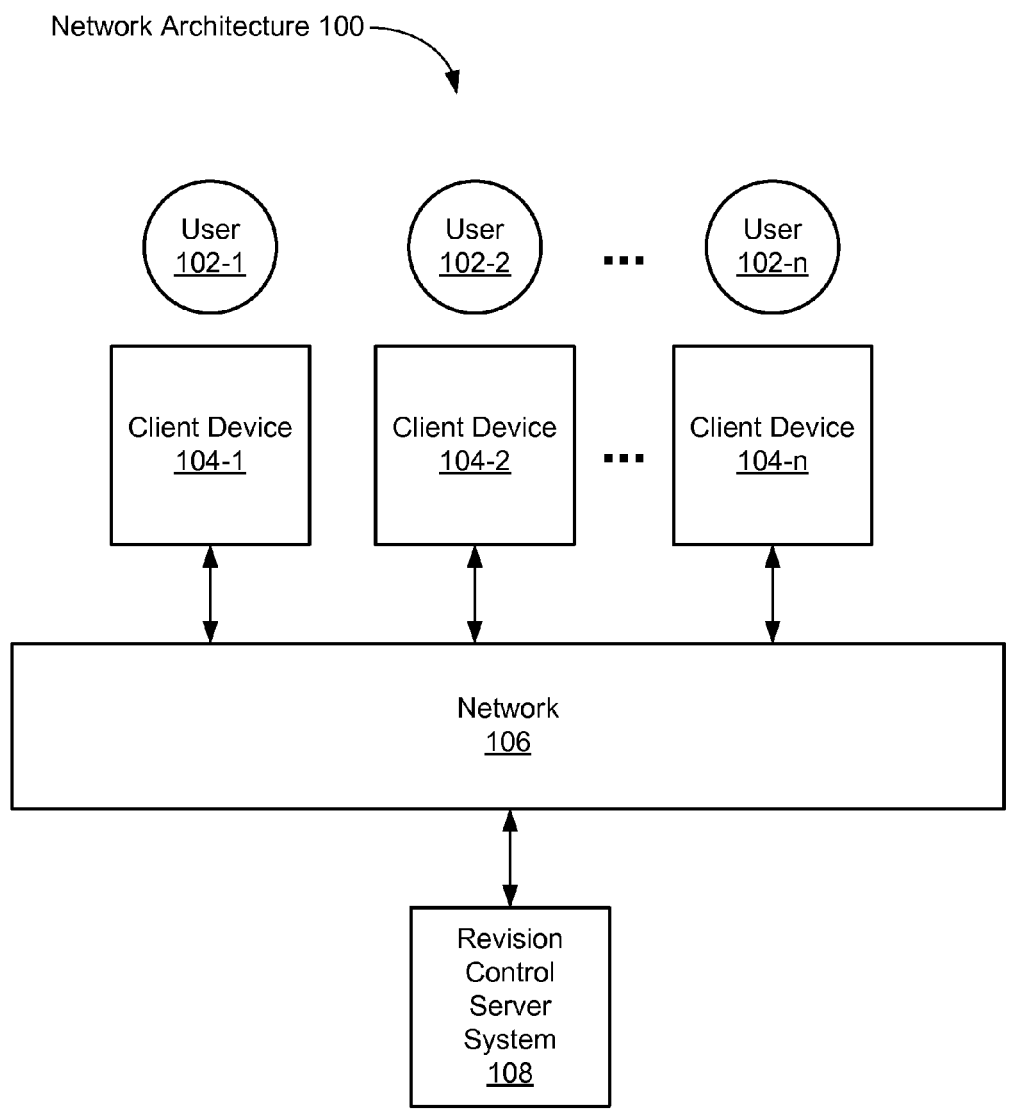
FIG. 1 is a block diagram illustrating an exemplary network architecture of a revision control system in accordance with some embodiments.

As noted above, because source code in a software program typically undergoes multiple revisions in the process of software development and maintenance, programmers often want to know which programmer(s)/author(s) are knowledgeable about a particular segment or segments of the source code (e.g., particular lines, blocks, paragraphs, functions, methods, or classes in the source code). Keeping track of which programmer(s)/author(s) are responsible for particular segments of source code as the source code changes can help troubleshoot those segments and allows further improvements to the software program to be made in a more efficient manner.

Accordingly, the present application describes devices, methods, and interfaces for attributing authorship to segments of source code. These devices and methods determine attribution values for authors of the segments. Attribution values are scores, percentages, letter grades, or the like that are determined for the authors of a particular segment of source code. Attribution values are based at least in part on changes in the particular segment of source code between different versions of the software program.

Attribution values provide an indication of the contribution of each author to the particular segment of source code. For example, if a first author writes a segment of source code, the attribution value for the first author will reflect that the segment is fully attributable to the first author (e.g., corresponding to an attribution value of 100%, or any other appropriate score, grade, etc.). If a second author subsequently makes a minor change to the segment (e.g., changing a variable name), the attribution value for the first author will decrease (e.g., from 100% to 90%), and an attribution value is determined for the second author that reflects the minor nature of the second author's changes (e.g., 10%). On the other hand, if the second author subsequently makes a major change to the segment, the attribution value for the first author decreases more significantly (e.g., from 100% to 20%), and the attribution value for the second author is correspondingly higher (e.g., 80%).

Attribution values are typically determined for each author who has edited the segment (including, in some embodiments, the original author of the segment). As additional authors further revise the software, attribution values are determined for those additional authors as well, taking into account both the contribution by the additional authors as well as the previous authors. Accordingly, users can see each of the multiple authors who have contributed to the segment. In addition, users can see attribution values for each of the multiple authors, which provide information concerning the significance of the contributions by each author. The attribution values provide insight into who may be responsible for, or understand, particular lines or other segments of the software program. In other words, attribution values provide an indication of who the experts are for particular lines or other segments of the software program at any given point in time.

Below, FIGS. 4A-4G, 5A-5B, 6A-6B, and 7A-7B illustrate exemplary user interfaces for attributing authorship to segments of source code. FIGS. 8A-8G are flow diagrams illustrating a method of attributing authorship to segments of source code. The user interfaces in FIGS. 4A-4G, 5A-5B, 6A-6B, and 7A-7B are used to illustrate the processes in FIGS. 8A-8G.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

FIG. 1 is a block diagram illustrating an exemplary network architecture in which a revision control system is implemented in accordance with some embodiments. The network architecture 100 includes a number of client devices (also called "client systems," "client computers," or "clients") 104-1, 104-2, . . . 104-n communicably connected to a revision control server system 108 by one or more networks 106. In some embodiments, the client devices 104 are part of a client-server relationship, where the server (e.g., the revision control server system 108) provides one or more functions or operations for implementing the methods and features described herein. As explained below, in some other embodiments, the client devices 104 are standalone systems that do not rely on or otherwise communicate with a server (e.g., the revision control server system 108) in order to implement the methods and features described herein.

In some embodiments, the client devices 104-1, 104-2, . . . 104-n are computing devices such as portable computers, tablet computers, laptop computers, desktop computers, etc., with one or more processors embedded therein or coupled thereto, or other appropriate computing devices that can be used to display, write, and/or modify software programs (e.g., source code files), or to determine and/or display author attribution values associated with segments of software programs.

In some embodiments, the revision control server system 108 is a single computing device such as a computer server, while in other embodiments, the revision control server system 108 is implemented by multiple computing devices working together to perform the actions of a server system (e.g., cloud computing).

In some embodiments, the network 106 is a public communication network (e.g., the Internet or a cellular data network), a private communications network (e.g., private LAN or leased lines), or a combination of such communication networks.

Users 102-1, 102-2, . . . 102-n, optionally, employ the client devices 104-1, 104-2, . . . 104-n to access the revision control server system 108. For example, one or more of the client devices 104-1, 104-2, . . . 104-n execute software program authoring environments that can be used to view, modify, change, or otherwise access software programs (e.g., source code files) that are stored on the revision control server system 108. As another example, one or more of the client devices 104-1, 104-2, . . . 104-n execute software applications (e.g., a revision control program, which may be part of a developer program) that can be used to view revision information stored on and/or generated by the revision control server system 108 (e.g., comparisons of portions of different versions of source code of a software program, author attribution values for segments of source code, etc.).

In some embodiments, either or both of the client device 104 and the revision control server system 108 determine author attribution values for segments of source code, as described herein.

Figure 2:
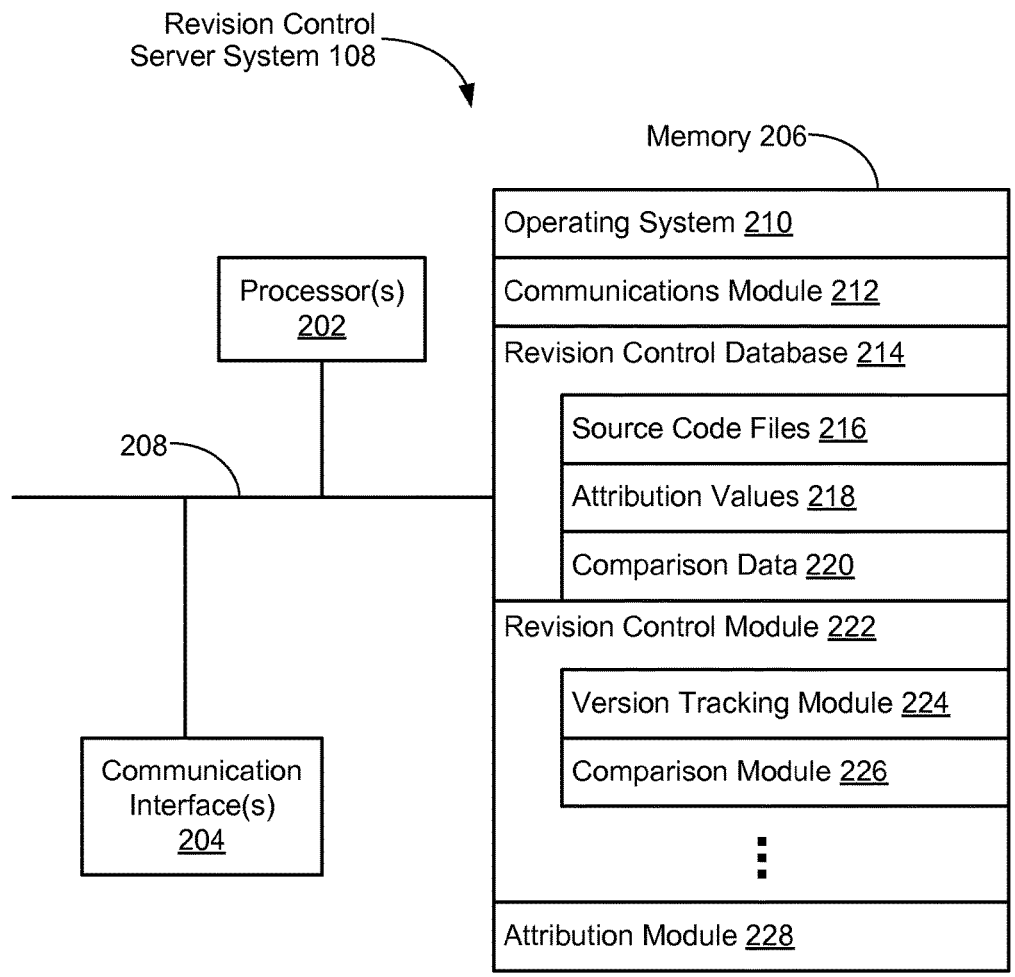
FIG. 2 is a block diagram illustrating an exemplary revision control server system in accordance with some embodiments.

FIG. 2 is a block diagram illustrating an exemplary revision control server system 108 in accordance with some embodiments. The revision control server system 108 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The revision control server system 108 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the processor(s) 202. Memory 206, or alternately the non-volatile memory device(s) within memory 206, includes a non-transitory computer readable storage medium. In some embodiments, memory 206 or the computer readable storage medium of memory 206 stores the following programs, modules and data structures, or a subset or superset thereof:

- an operating system 210 that includes procedures for handling various basic system services and for performing hardware dependent tasks;
- a network communication module 212 that is used for connecting the revision control server system 108 to other computers via the one or more communication network interfaces 204 (wired or wireless) and one or more communication networks, such as the Internet, cellular telephone networks, mobile data networks, other wide area networks, local area networks, metropolitan area networks, and so on;
- a revision control database 214 for storing data associated with software programs and revisions to software programs, such as:
  source code files 216, including source code files corresponding to different versions of software programs;
  attribution values 218; and
  comparison data 220;
- a revision control module 222 for providing revision control services and related functions, which includes:
  a version tracking module 224 for saving source code files of different versions of software programs (e.g., in response to "commit" or "save" instructions from a client device), serving, to client devices, source code files requested by the client devices, and tracking the different versions of software programs for identification and/or retrieval (e.g., assigning version numbers, time/date stamping different versions, creating and/or modifying metadata associated with different versions, and the like); and
  a comparison module 226 for comparing source code files, such as source code files representing different versions of a particular software program, and generating comparison data (e.g., comparison data 220); and
  an attribution module 228 for determining attribution values 218 for various authors for segments of source code within the software programs.

The revision control database 214 stores data associated with revisions to software programs in one or more types of databases, such as graph, dimensional, flat, hierarchical, network, object-oriented, relational, and/or XML databases. In some embodiments, the revision control server 108 provides revision control functionality for one or more client computers 104. Accordingly, in some embodiments, the data stored in the revision control database 214 (e.g., source code files corresponding to different versions of software programs) is created on a client device 104 and is sent to the revision control server system 108. Further, in some embodiments, the data stored in the revision control database 214 is accessible by one or more client devices 104.

Source code files 216 include source code files for different versions of software programs. Source code files are, typically, text files that include computer instructions written in a human-readable computer language (e.g., Python, Java, C, Ruby, SQL, etc.). A source code file can be generated in response to a "save" or "commit" request by an author. In some embodiments, when the source code file generated in response to a "save" or "commit" request is a revised version of a previously saved source code file, the revised version is saved as a separate file and is associated with the previously saved source code file (e.g., as a subsequent version in a chain of source code files). In some embodiments, the source code file corresponding to the revised version is assigned a version number indicating its version with respect to an initial (or previous) version of the software file.

Attribution values 218 include attribution values for one or more authors of the source code files 216. In some embodiments, attribution values 218 for a particular source code file (or portion thereof) are stored in the particular source code file, such as in a header or metadata portion of the file, or in a separate data file container associated with the source code file. As described herein, attribution values indicate a relative degree of contribution made by a particular author to a particular segment of source code.

Comparison data 220 includes information specifying differences between given source code files 216 or portions thereof. In some embodiments, comparison data 220 is generated by the comparison module 226 of the revision control module 222. In some embodiments, comparison data 220 is used to display differences between source code files. For example, comparison data 220 can be used to display a source code file where differences between the source code files are distinctively displayed (e.g., code that has been deleted is shown in strikethrough, and code that has been added is shown underlined). In some embodiments, comparison data 220 is used by the attribution module 228 to determine attribution values for segments of the source code. Comparison data 220 is stored as any appropriate data structure, such as a text file (e.g., ASCII, SGML, HTML), a table, or the like.

The version tracking module 224 facilitates tracking and storage of different versions of software programs. For example, the version tracking module 224 receives requests to "save" or "commit" a source code file of a software program (e.g., from a client device 104), and the version tracking module 224 saves the source code file in the revision control database 214 in conjunction with a version identifier. In some embodiments, the version tracking module 224 communicates with one or more client devices 104 to send requested source code files to the client device. For example, the version tracking module 224 receives a request for a particular version of a software program, and the version tracking module 224 retrieves the corresponding source code file from the revision control database 214 and sends the source code file to the requesting client device. In some embodiments, the version tracking module 224 automatically assigns version indicators (e.g., numbers) to source code files upon receiving a request to "save" or "commit" the source code file. For example, when a client "saves" or "commits" a revised source code file, the version tracking module 224 automatically applies a version indicator that indicates the particular version of the software program that the revised source code file represents.

The comparison module 226 compares source code files and generates comparison data. In some embodiments, the comparison module 226 is or includes a file comparison utility, such as the "diff" utility used in UNIX or UNIX-based computer systems. In some embodiments, source code files are compared in response to a request from a client device 104. For example, a user 102 of a client device 104 may request author attribution values for a portion of a particular version of a software program. In such cases, the comparison module 226 generates a comparison of two versions of the software program. In some embodiments, the comparison is then made accessible to the attribution module 228.

The attribution module 228 determines attribution values for various authors of software programs. In some embodiments, the attribution module 228 determines attribution values for segments of source code of a software program. As described herein, in some embodiments a segment is a single line of source code. In some embodiments, a segment is multiple lines of source code. In some embodiments, where a segment includes multiple lines of source code, attribution values are assigned to each line of code in the segment. In some embodiments, where a segment includes multiple lines of source code, attribution values are assigned to the segment in its entirety. Segments, and how attribution values are assigned to segments (and/or parts of the source code within segments), are explained below.

In some embodiments, the comparison module 226 of the revision control module 222 identifies segments of source code for which attribution values are determined. For example, when comparing two source code files, the comparison module 226 identifies segments in both source code files that correspond to one another. Segments of source code may, but need not, have the same number of lines of source code. In some embodiments, the attribution module 228 identifies the segments of source code for which attribution values are determined (e.g., using a comparison module, not shown, that is separate from a revision control system).

In some embodiments, the attribution module 228 is part of (e.g., is a sub-module of) the revision control module 222. In some embodiments, the attribution module 228 is a separate module from the revision control module 222, but communicates with the revision control module 222 (e.g., via one or more application programming interfaces ("APIs")) to receive information such as identifiers of segments of source code (e.g., line numbers defining the start and end lines of segments) for which attribution values are to be determined.

As described herein, in some embodiments, the revision control database 214, the revision control module 222, and/or the attribution module 228 communicate with one or more client devices 104 to provide revision control and author attribution functionality to the one or more client devices 104.

Figure 3:
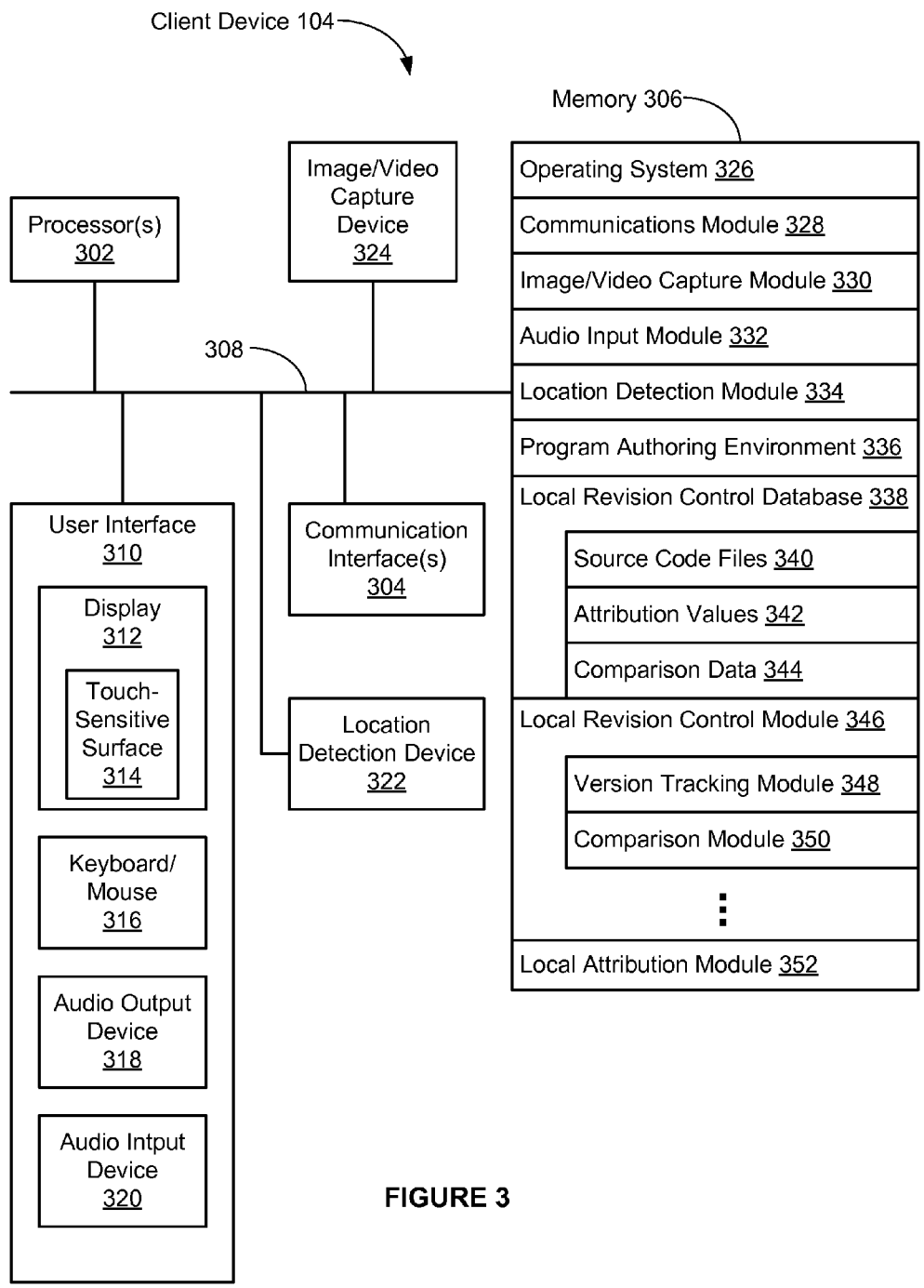
FIG. 3 is a block diagram illustrating an exemplary client device in accordance with some embodiments.

FIG. 3 is a block diagram illustrating an exemplary client device 104 in accordance with some embodiments. The client device 104 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 104 includes a user interface 310. The user interface 310 typically includes a display device 312. In some embodiments, the client device includes inputs such as a keyboard, mouse, and/or other input buttons 316. Alternatively or in addition, in some embodiments, the display device 312 includes a touch-sensitive surface 314, in which case the display device 312 is a touch-sensitive display. In client systems that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 104 use a microphone and voice recognition to supplement or replace the keyboard. Optionally, the client device 104 includes an audio input device 320 (e.g., a microphone) to capture audio (e.g., speech from a user). Optionally, the client device 104 includes a location detection device 322, such as a GPS (global positioning satellite) or other geo-location receiver, for determining the location of the client device 104. The client device 104 also optionally includes an image/video capture device 324, such as a camera or webcam.

Memory 306 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the processor(s) 302. Memory 306, or alternately the non-volatile memory device(s) within memory 306, includes a non-transitory computer readable storage medium. In some embodiments, memory 306 or the computer readable storage medium of memory 306 stores the following programs, modules and data structures, or a subset or superset thereof:

- an operating system 326 that includes procedures for handling various basic system services and for performing hardware dependent tasks;
- a network communication module 328 that is used for connecting the client device 104 to other computers via the one or more communication network interfaces 304 (wired or wireless) and one or more communication networks, such as the Internet, cellular telephone networks, mobile data networks, other wide area networks, local area networks, metropolitan area networks, and so on;

an optional image/video capture module 330 (e.g., a camera module) for processing a respective image or video captured by the optional image/video capture device 324;

an optional audio input module 332 (e.g., a microphone module) for processing audio captured by the optional audio input device 320;

an optional location detection module 334 (e.g., a GPS, Wi-Fi, or hybrid positioning module) for determining the location of the client device 104 (e.g., using the optional location detection device 322) and providing this location information for use in various applications;

a software program authoring environment 336 that enables the display, writing, and/or modification of software programs (e.g., source code files of software programs);

an optional local revision control database 338 for storing data associated with software programs and revisions to software programs, such as:
  source code files 340, including source code files corresponding to different versions of software programs;
  attribution values 342; and
  comparison data 344;

an optional revision control module 346 for providing revision control services and related functions, which includes:
  a version tracking module 348 for saving source code files of different versions of software programs (e.g., in response to "commit" or "save" instructions from the software program authoring environment 336), and tracking the different versions for identification and/or retrieval (e.g., assigning version numbers, time/date stamping different versions, creating and/or modifying metadata associated with different versions, and the like); and
  a comparison module 350 for comparing source code files, such as source code files representing different versions of a software program, and generating comparison data (e.g., comparison data 344); and an optional local attribution module 352 for determining attribution values for various authors for segments of source code within the software programs.

The software program authoring environment 336 enables users to display, write, and/or modify software programs, including source code files of software programs. In some embodiments, the software program authoring environment includes a text editor in which source code files are displayed, written, and/or modified. In some embodiments, the software program authoring environment 336 communicates with the revision control server system 108. In some embodiments, the revision control server system 108 provides revision control functions and services for the software program authoring environment 336, including storing, tracking, and comparing different versions of software programs (e.g., source code files), or portions thereof. For example, in some embodiments, source code files created and/or modified in the software program authoring environment 336 by a user 102 are sent to the revision control server system 108, which then applies appropriate version numbers to the source code files (e.g., with the version tracking module 224), and stores the source code files (e.g., in the revision control database 214). Upon request from the client 104 for a particular source code file, the revision control server system 108 retrieves and sends the requested source code files to the client device 104 (e.g., to the software program authoring environment 336).

In some embodiments, the revision control server system 108 provides software program comparison and author attribution functions and services for the client device 104. For example, upon receiving a request from the client device 104 for a comparison between two versions of a software program (e.g., two different source code files corresponding to different versions of the software program), the revision control module 222 of the revision control server system 108 retrieves and compares the appropriate source code files, and provides the comparison to be sent to the client device 104. In some embodiments, the comparison is displayed in a user interface of the program authoring environment 336, or a user interface of any other appropriate software, program, or module of the client device 104. Moreover, in some embodiments, upon receiving a request from the client device 104 for author attribution values associated with a software program (e.g., a source code file corresponding to a given version of the software program), the attribution module 228 determines attribution values for one or more authors of the software program, which are then sent to the client device 104 (e.g., for display by the program authoring environment 336). Techniques for determining attribution values are explained herein.

In some embodiments, the client device 104 optionally includes a local revision control database 338 (storing source code files 340, attribution values 342, and comparison data 344), a local revision control module 346 (including a version tracking module 348 and a comparison module 350), and/or a local attribution module 352. Details of these modules are described above with reference to analogous modules in the revision control server system 108; for brevity, these details are not repeated here.

In some embodiments, the client device 104 is a stand-alone system. In some embodiments, the client device 104 provides revision control functionality, using the foregoing optional modules, independent of a revision control server system. For example, instead of requesting source code files from the revision control database 214 of the revision control server 108, the client device 104 retrieves source code files from its own revision control database 338. Similarly, instead of requesting attribution values from the revision control server 108, the client device 104 determines attribution values with the local attribution module 352. In some embodiments, any functionality provided by a program or module of the revision control server system 108 is, instead, provided by an analogous local program or module of the client device 104.

In some embodiments, both server-based modules and client-based modules are used to provide the revision control and author attribution services and/or functions described herein. For example, in some embodiments, the client device 104 executes a local revision control module 346 and a local attribution module 352, but stores and retrieves source code files from the revision control database 214 of the revision control server 108. In this case, the client device 104 may not include a local revision control database 338. As another example, in some embodiments, the client device 104 executes a local attribution module 352, but relies on the revision control module 222 and the revision control database 214 of the revision control server system 108 to provide revision control and file comparison services.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

Attention is now directed towards embodiments of user interfaces ("UI") and associated processes that may be implemented on a client device (e.g., the client device 104 in FIG. 3).

FIGS. 4A-4G illustrate exemplary user interfaces on a client device 104 for displaying attribution values in conjunction with segments of source code in accordance with some embodiments. The user interfaces in these figures are used to illustrate the processes described below, including the processes in FIGS. 8A-8G.

Figure 4A:
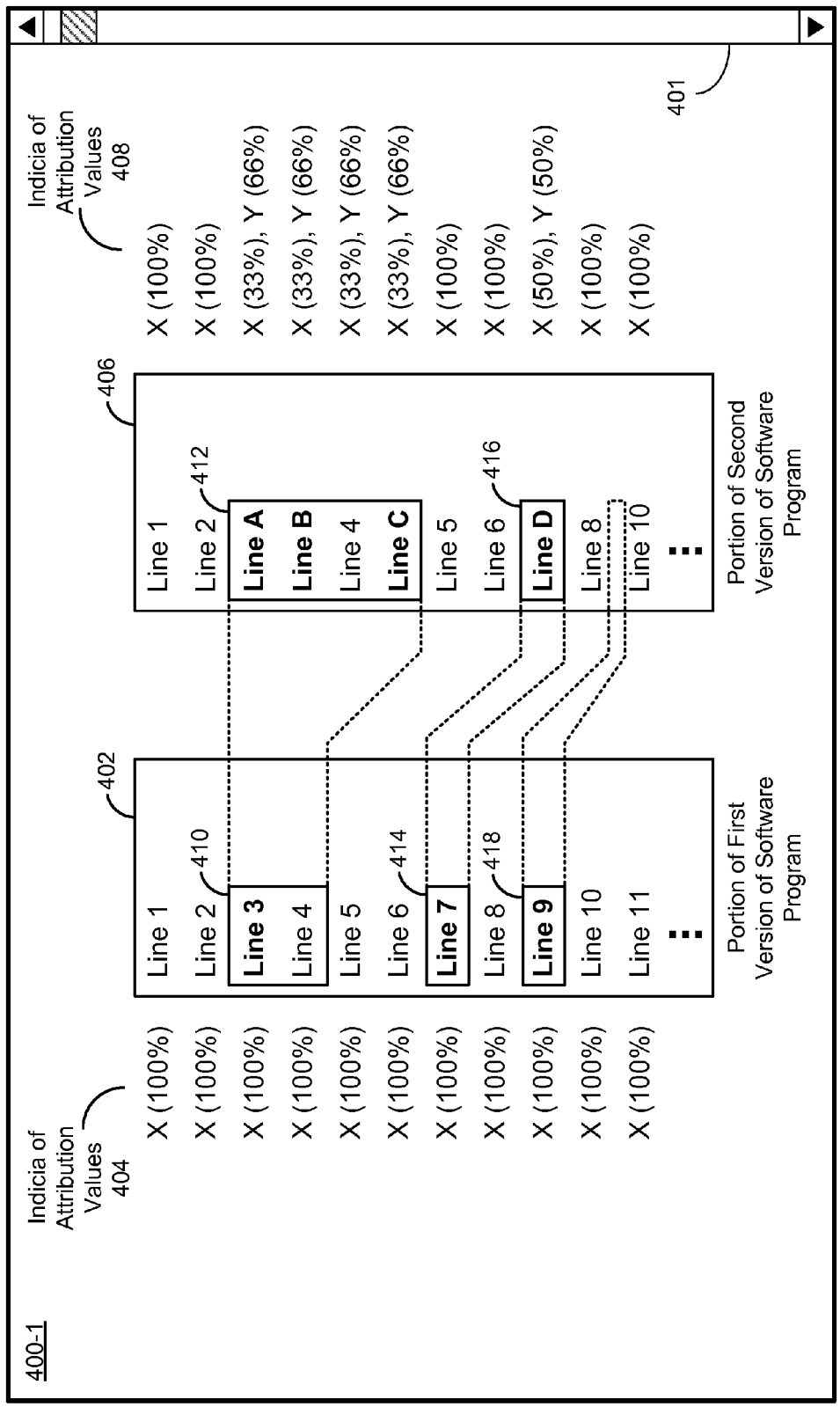

With reference to FIG. 4A, user interface 400-1 displays of a portion of a first version of a software program 402 and a portion of a second version of the software program 406 (also called "first version" and "second version," respectively), where the second version has been revised as compared to the first version. The displayed portions of the software program represent source code of the software program.

In some embodiments, the first version of the software program corresponds to a first commit of the software program in a revision control system, and the second version of the software program corresponds to a subsequent commit of the software program in the revision control system.

In some embodiments, the user interface 400-1 includes a scroll bar 401 to allow a user to display other portions (not shown) of the software program.

The user interface 400-1 also includes exemplary indicia of attribution values 404 for an author X associated with the first version of the software program 402, namely "X (100%)." In some embodiments, a value of 100% indicates that the corresponding segment of source code was written entirely by that author. Thus, as shown in FIG. 4A, each line in the displayed portion of the first version of the software program 402 was written by author X.

While various different indicia of attribution values are sometimes referred to herein merely as "attribution values," it will be understood that these indicia may or may not actually be the calculated attribution values. In particular, while the present discussion sometimes equates attribution values with percentages (e.g., stating that an author X is associated with an attribution value of 100%), the underlying attribution value need not be a percentage value.

The user interface 400-1 also includes exemplary indicia of attribution values 408 for authors associated with the second version of the software program 406. For segments of the source code in the second version 406 that have not changed relative to corresponding segments in the first version 402 (including, for example, Lines 1-2, 5-6, 8, and 10), the indicium of the attribution value remains the same for both versions, namely "X (100%)." For segments in the second version of the software program 406 that have changed relative to corresponding segments in the first version 402, two attribution values are displayed: one that indicates the attribution value for the author of the first version and one that indicates the attribution value for the author who made the revisions to the first version.

Specifically, the user interface 400-1 displays several segments of source code in the second version of the software program (segments 412 and 416) that have changed relative to corresponding segments of source code in the first version of the software program (segments 410 and 414, respectively). The user interface 400-1 also displays a segment 418 of source code in the first version of the software program that was deleted in the second version of the software program. For clarity, lines that have changed between the first version and the second version are shown in bold type in FIG. 4A. In various embodiments, changes between lines or portions of lines between different versions of a software program are indicated in any appropriate manner (e.g., underlines, strikethroughs, highlights, font color, font style, etc.). In some embodiments, changes between lines or portions of lines are not indicated.

In some embodiments, corresponding segments of source code in different versions of a software program are determined by a comparison program or module (e.g., a "diff" utility) that identifies differences between source code files (or portions thereof) and groups lines of source code into segments (e.g., using techniques such as the longest common subsequence, longest increasing subsequence, rolling hash functions, and/or the Hunt-McIlroy algorithm). Notably, as identified by a given diff utility, a segment in one version of a software program may, but need not, have the same number of lines as a corresponding segment in another version of the software program. For example, segment 412 includes four lines of source code, whereas segment 410 includes only two.

With reference to segment 412, several lines have changed relative to the corresponding segment 410 in the first version of the software program. In particular, "Line 3" has been deleted in the second version, and "Line A," "Line B," and "Line C" have been added. Based on the differences between segment 412 and segment 410, attribution values for both the first and second author are displayed in conjunction with segment 412. Specifically, the attribution value for author X is shown as "X (33%)" and the attribution value for author Y is shown as "Y (66%)." Accordingly, a user viewing the indicia of attribution values 408 can infer that author Y likely has a greater understanding of the code in segment 412 (or at least made a larger contribution to the segment), because the attribution value for author Y is greater than that for author X. If the diff utility identified the segments differently, these attribution values could change based on the segments actually identified.

In the example shown in FIG. 4A, the attribution values are determined for the segment as a whole, but are displayed for each line within the segment. In particular, for "Line A" in segment 412, the attribution value for author X, namely "X (33%)," does not necessarily indicate that "Line A" contains code that was written by or otherwise attributable to author X. Rather, the attribution values are determined based on all of the differences between segments 412 and 410 (e.g., a number of lines that have been added, removed, or changed to the overall segment), and the attribution value for the segment as a whole is displayed in conjunction with each line. Other techniques for displaying indicia of attribution values are discussed with reference to FIGS. 4C-4F.

Turning to segments 416 and 414 in FIG. 4A, in the second version of the software program 406, author Y replaced "Line 7" with "Line D." Thus, although none of the lines of code in segment 414 of the first version of the software remain in the corresponding segment 416 in the second version of the software, an attribution value for author Y is shown as "Y (50%)," and an attribution value for author X is shown as "X (50%)." In some other embodiments, author Y is given an attribution value of 100% (not shown).

Segment 418 refers to a line of source code that was deleted from the first version of the software program, and thus has no corresponding line in the second version. In some embodiments, where no corresponding segment of source code exists in a second version of a software program, no attribution values are determined (or displayed) to reflect the deletion. In particular, as shown in FIG. 4A, while author Y deleted "Line 9" from the first version of the software program, no attribution value is displayed to reflect the deletion. On the other hand, in some embodiments, attribution values are determined (and displayed) for such deletions. For example, FIG. 4G illustrates a user interface 400-7 in which the indicia of attribution values 452 include an indicium of attribution for author Y displayed alongside a blank line corresponding to the line deleted by author Y. In some embodiments, indicia of attribution for the author(s) of the deleted line would also be displayed (not shown).

In some embodiments, indications of lines or segments that were deleted from the first version of the software program are displayed, whether or not attribution values are determined for the deleted lines. For example, as shown in the user interface 400-7 in FIG. 4G, a blank line is included in the displayed portion of the second version of the software program to indicate where the deletion occurred (i.e., after "Line 8" in the portion of the second version of the software program 450). In some embodiments, instead of or in addition to a blank line (or lines), additional text or symbols are displayed to indicate the deleted line(s). For example, in some embodiments, the content of the deleted line(s) are displayed in a different format (e.g., strikethrough text, underlined, distinctive background color/highlighting, distinctive font color, etc.). In some embodiments, the deleted line(s) are indicated by replacing or prepending the content of the deleted line(s) with one or more symbols (e.g., "#," "/," "*," "!," etc.).

In some embodiments, even if attribution values are not determined for deleted lines, indications of the deleted lines are displayed in the user interface. For example, user interface 400-7 would omit the attribution value "Y (100%)" that appears next to the blank line following "Line 8."

Figure 4B:
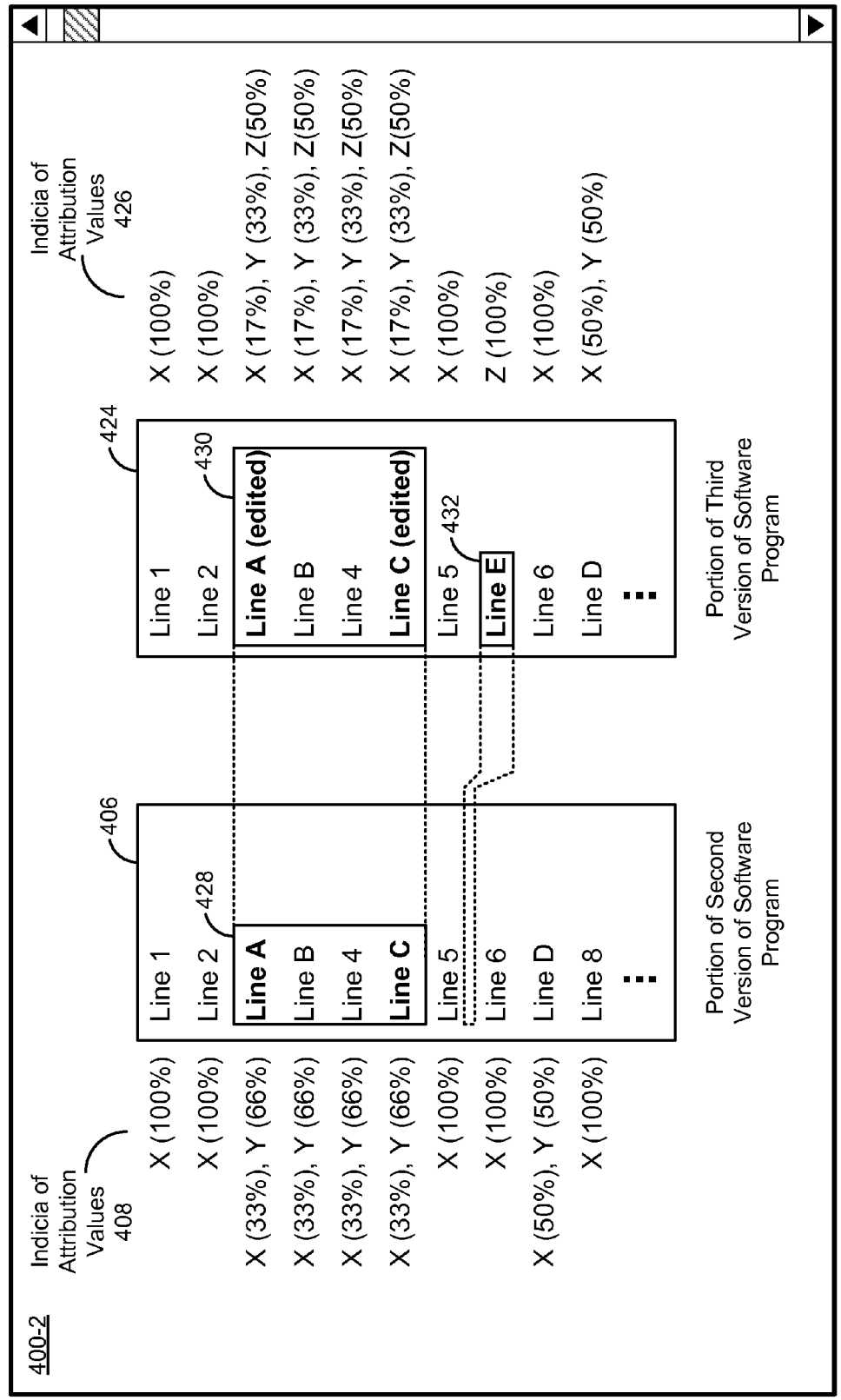

In FIG. 4B, user interface 400-2 displays the portion of the second version of the software program 406 and a portion of a third version of the software program 424, where the third version of the software program 424 has been revised as compared to the second version of the software program 406. In particular, while the displayed portion of the second version of the software program 406 includes attribution values for two authors (author X and author Y), the displayed third version of the software program 424 includes attribution values for three authors (author X, author Y, and author Z), reflecting the fact that the third version includes revisions written by author Z.

In particular, the third version 424 includes segment 430 that corresponds to segment 428 in the second version 406. Segment 430 includes two lines of source code that have been edited as compared to corresponding lines in segment 428. Accordingly, indicia of attribution values 426 for the third version 424 reflect the difference between the corresponding segments, where the attribution values for authors X and Y are modified, and an attribution value for author Z is added. The resulting attribution values for segment 424, namely, "X (17%)," "Y (33%)," "Z(50%)," reflect the relative contribution of authors X, Y, and Z to segment 430, and indicate that these authors likely all have some knowledge of segment 430.

Similar to segment 412 in FIG. 4A, the attribution values for segment 430 are determined for the segment as a whole, but are displayed for each line within the segment. Thus, "Line B" and "Line 4" in segment 430 are displayed in conjunction with an attribution value for author Z, namely "Z (50%)," even though these lines were not revised by author Z.

The displayed portion of the third version of the software program 424 also includes segment 432 that does not have a corresponding segment in the second version of the software program 406. Accordingly, because this line was newly written by author Z, the indicium of the attribution value for this segment is "Z (100%)," reflecting that this line of code is not attributable to any of the previous authors (i.e., author X or author Y).

In some embodiments, attribution values are determined based at least in part on a number of lines that have been added to a segment of source code, the number of lines that have been removed from the segment of source code, the total number of lines in a first version of the segment, and/or the total number of lines in a revised version of the segment. For example, as described above with respect to segments 412 and 410 in FIG. 4A, the indicia of attribution values for segment 412 reflect the fact that the revision by author Y resulted in the addition of three lines of source code, and the deletion of one line of source code. In some embodiments, a change to a previous line of source code is considered to be a deletion of the previous line of code and an addition of a new line of code. For example, attribution values for segment 430 are determined based on the deletion of two lines ("Line A" and "Line C") and the addition of two lines ("Line A (edited)" and "Line C (edited)"), even though "line A" and "Line C" were not deleted, but merely edited (e.g., a portion of "Line A" remains unmodified in the edited version of "Line A"). Exemplary techniques and formulas for determining attribution values are described herein.

In some embodiments, attribution values are determined by determining a similarity between a segment of source code in a first version of a software program and a corresponding segment of source code in a second version of the software program, where the corresponding segment of source code in the second version of the software program has changed (e.g., has been revised) relative to the segment of source code in the first version of the software program. Attribution values are then calculated for each author associated with the corresponding segment in the second version of the software program. For example, in some embodiments, the similarity between a segment of source code in a first version of a software program and a corresponding segment of source code in a second version of the software program is defined as:

$$\text{Similarity} = \frac{\text{MIN}(L1, L2)}{L1 + L2} \quad (1)$$

where:

Similarity is a value representing a similarity between corresponding segments of software code;

L1 is the total number of lines in the segment of source code in the first version of the software program;

L2 is the total number of lines in the corresponding segment of source code in the second version of the software program; and MIN (L1,L2) is the lesser of value L1 or L2.

Using an example from FIG. 4A, the total number of lines in segment 410 is 2 (L1=2), and the total number of lines in segment 412 is 4 (L2=4). Substituting these values into formula (1) gives the result:

$$Similarity_{410,412} = \frac{2}{2+4} = 0.33$$

In some embodiments, an attribution value for an author who revised the segment of source code in the first version of the software program, thus creating the corresponding segment of source code in the second version of the software program is defined as:

$$Attrib_{RA} = (Similarity * PriorAttrib_{RA}) + (1 - Similarity) \quad (2)$$

where:

$Attrib_{RA}$ is the attribution value for the revising author (i.e., the author who revised the segment of source code in the first version of the software program, thus creating the corresponding segment of source code in the second version of the software program); and $PriorAttrib_{RA}$ is the prior attribution value for the revising author of the segment of source code in the first version of the software program (if the revising author was not an author of the segment of source code in the first version of the software program, then $PriorAttrib_{RA}$ equals zero).

Continuing the example using segments 410 and 412 from FIG. 4A, formula (2) is used to determine the attribution value of author Y, as author Y is the author that revised segment 410 resulting in segment 412. Because author Y did not have a prior attribution value for segment 410, the prior attribution value, $PriorAttrib_{RA}$, is zero. Accordingly, substituting the appropriate values into formula (2) gives the result:

$$Attrib_{Author\ Y} = (0.33 * 0) + (1 - 0.33) = 0.66$$

Thus, the attribution value for author Y for segment 412 is 0.66, or 66%.

In some embodiments, an attribution value for an author of the segment of source code in the first version of the software program who did not revise the segment of source code in order to create the corresponding segment of source code in the second version of the software program is defined as:

$$Attrib_{PA} = (Similarity * PriorAttrib_{PA}) \quad (3)$$

where:

$Attrib_{PA}$ is the attribution value for the prior author (i.e., the author of the segment of source code in the first version of the software program, who did not revise the segment of source code in order to create the corresponding segment of source code in the second version of the software program); and $PriorAttrib_{PA}$ is the prior attribution value for the prior author of the segment of source code in the first version of the software program.

Continuing the example using segments 410 and 412 from FIG. 4A, formula (3) is used to determine the attribution value of author X, as author X is an author of segment 410, and author X did not revise segment 410 to create segment 412. Because author X was the sole author of segment 410, the $PriorAttrib_{PA}$ is 1.0 (e.g., 100%). Accordingly, substituting the appropriate values into formula (3) gives the result:

$$Attrib_{Author\ X} = (0.33 * 1) = 0.33$$

Thus, the attribution value for author X for segment 412 is 0.33, or 33%. The attribution values according to formulas (1)-(3) are reflected in FIG. 4A, which displays the attribution value of 33% for author X and 66% for author Y.

FIG. 4B illustrates an example where the prior version of a segment was already associated with attribution values of a plurality of authors. Specifically, segment 428 is displayed in conjunction with attribution values for author X ("X (33%)") and author Y ("Y (66%)"), indicating, for example, that segment 428 is not the initial version of the segment, but rather has already been revised by either author X or author Y. As described above, segment 428 corresponds to segment 412 in FIG. 4A.

In FIG. 4B, segment 430 corresponds to a revised version of segment 428, having been revised by author Z. In particular, author Z revised segment 428 by editing "Line A" and "Line C," resulting in segment 430. Substituting values into formulas (1)-(3), above, attribution values for segment 430 for authors X, Y, and Z are calculated as follows:

$$Similarity_{428,430} = \frac{4}{4+4} = 0.5$$

$$Attrib_{Author\ Z} = (0.5 * 0) + (1 - 0.5) = 0.5$$

$$Attrib_{Author\ X} = (0.5 * .33) = 0.17$$

$$Attrib_{Author\ Y} = (0.5 * .66) = 0.33$$

Thus, for segment 430, the attribution value for author Z is 0.5, or 50%, the attribution value for author X is 0.17, or 17%, and the attribution value for author Y is 0.33, or 33%. FIG. 4B illustrates these attribution values in association with segment 430.

Figure 4C:
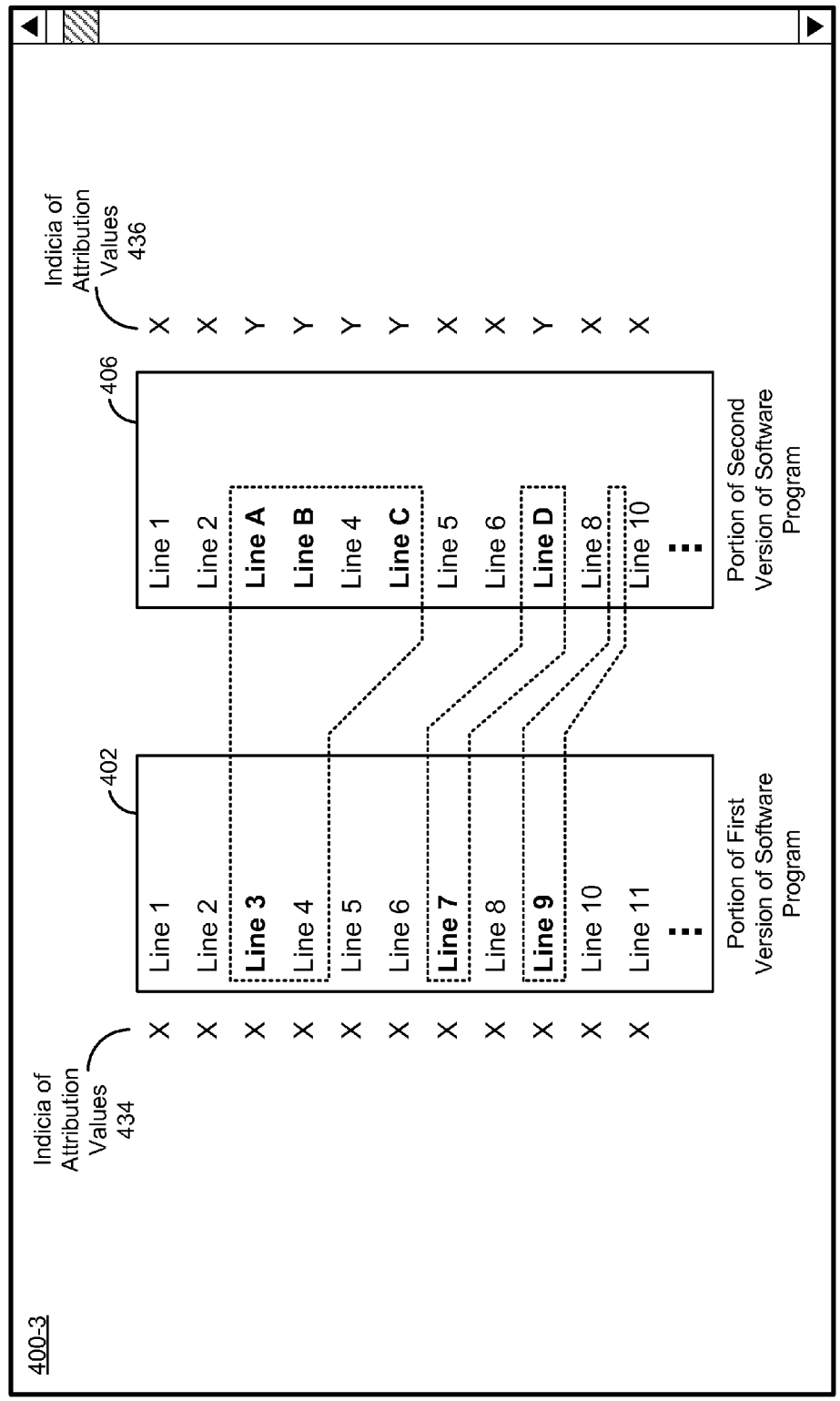

In FIG. 4C, user interface 400-3 displays the portion of the first version of the software program 402 and the portion of the second version of the software program 406, as described above with respect to FIG. 4A. However, in FIG. 4C, the indicia of attribution values 434 and 436 are displayed in a different manner than in FIG. 4A. In particular, although the attribution values underlying the displayed indicia in FIG. 4C are the same as those underlying the displayed indicia in FIG. 4A, only one author is identified for each line of source code in FIG. 4C. Specifically, indicia of attribution values (e.g., "X" for Line 1 and "Y" for Line A in FIG. 4C) are only displayed for the author having the highest attribution value for a corresponding segment. Thus, the indicia of attribution values 434 displayed in conjunction with the portion of the first version of the software program 402 indicate that each line was written by author X, and the indicia of attribution values 436 displayed in conjunction with the portion of the second version of the software program 406 indicate only the author who has the highest attribution value for that line. Thus, with respect to the second version, Line 1 indicates only author X, because author X is entirely responsible for Line 1. On the other hand, Line A, which is 66% attributable to author Y and 33% attributable to author X, indicates only author Y.

In some embodiments, where the indicia of the attribution values indicate only one author, whichever author is associated with the highest attribution value is indicated. Thus, if a segment is associated with three authors having respective attribution values of 20%, 30%, and 50%, the author associated with the attribution value of 50% will be listed. In some embodiments, in the case of a tie, the author who made the most recent edit is indicated. For example, if the respective attribution values for two authors of a segment are both 50%, the author who most recently edited the software program is indicated. In other embodiments, in case of a tie, all of the tied authors are indicated. For example, if three authors are all associated with an attribution value of 33%, then all three authors are indicated.

Figure 4D:
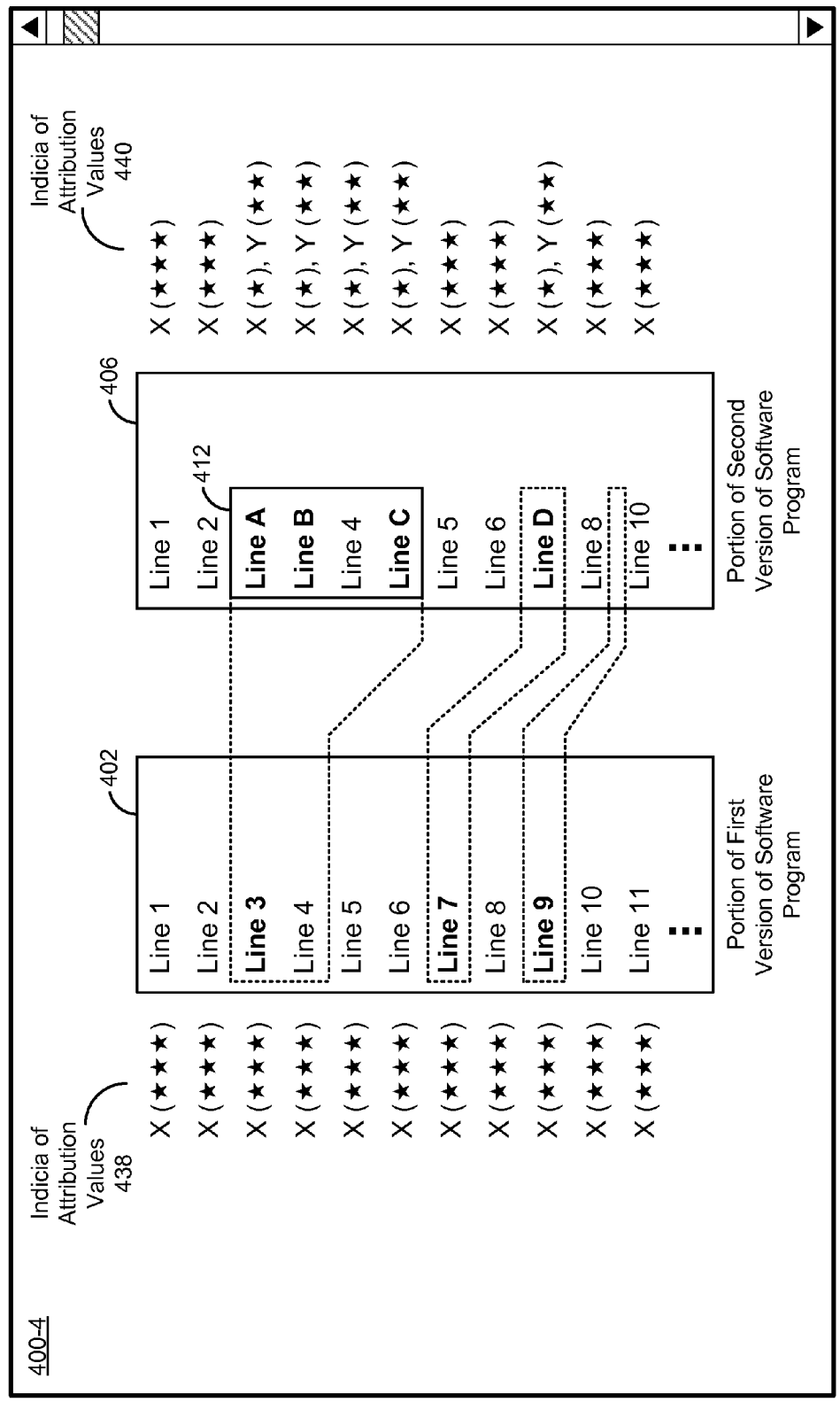

In FIG. 4D, user interface 400-4 displays the portion of the first version of the software program 402 and the portion of the second version of the software program 406, as described above with respect to FIG. 4A. Once again, the attribution values underlying the displayed indicia in FIG. 4D are the same as those underlying the displayed indicia in FIG. 4A. However, in FIG. 4D, the indicia of attribution values 438 and 440 are symbolic representations of the attribution value of each author. While FIG. 4D uses stars to indicate attribution values of different authors, other symbols are used in some embodiments instead of or in addition to stars, such as asterisks, dots, plus signs, dollar signs, emoji, etc.

In FIG. 4D, the maximum attribution value (e.g., 100%) is associated with three stars. Thus, because author X wrote each of the lines in the displayed portion of the first version of the software program 402, each line in the first version indicates that author X has three stars. Where a line is attributable to multiple authors, such as "Line A" and "Line B," each author is given zero, one, or two stars, depending on the underlying attribution value for each author. In some embodiments, any nonzero attribution value for an author results in a one-star rating. In some embodiments, any attribution value above 33% results in a two-star rating. Other techniques for assigning symbolic indicia of attribution values are also used in various embodiments. In some embodiments, in case of a tie, the author who most recently edited the software program is given a greater number of stars. For example, for "Line D" in FIG. 4D, the underlying attribution values for authors X and Y are both 0.5 or 50%.

Figure 4E:
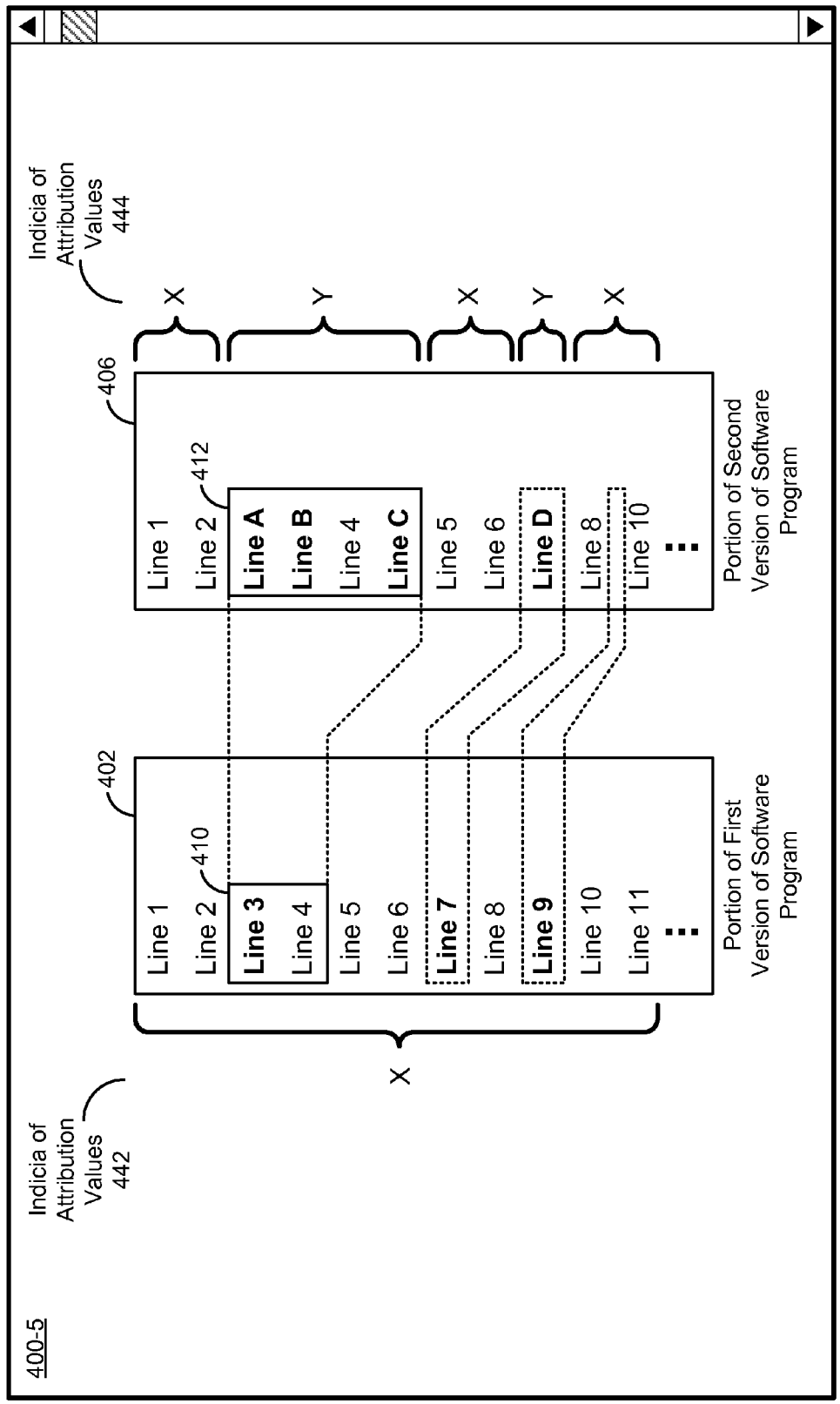

In FIG. 4E, user interface 400-5 displays the portion of the first version of the software program 402 and the portion of the second version of the software program 406, as described above with respect to FIG. 4A. Once again, the attribution values underlying the displayed indicia in FIG. 4E are the same as those underlying the displayed indicia in FIG. 4A. However, in FIG. 4E, the indicia of attribution values 442 and 444 are displayed for segments as a whole, and not for each line in a given segment. Moreover, as described with respect to FIG. 4C, only one author is indicated for each segment or group of contiguous lines having the same attribution values. For example, segment 412 is displayed in conjunction with a single indicium for author Y, indicating that this author has the highest attribution value for this segment. While "Line 1" and "Line 2" in the second version are not identified as a segment that includes revisions with respect to the first version, these lines are nonetheless grouped together for the purposes of displaying indicia of attribution values. In particular, because both "Line 1" and "Line 2" are associated with the same underlying attribution value (e.g., the value for "X (100%)"), only one indicium is displayed.

Figure 4F:
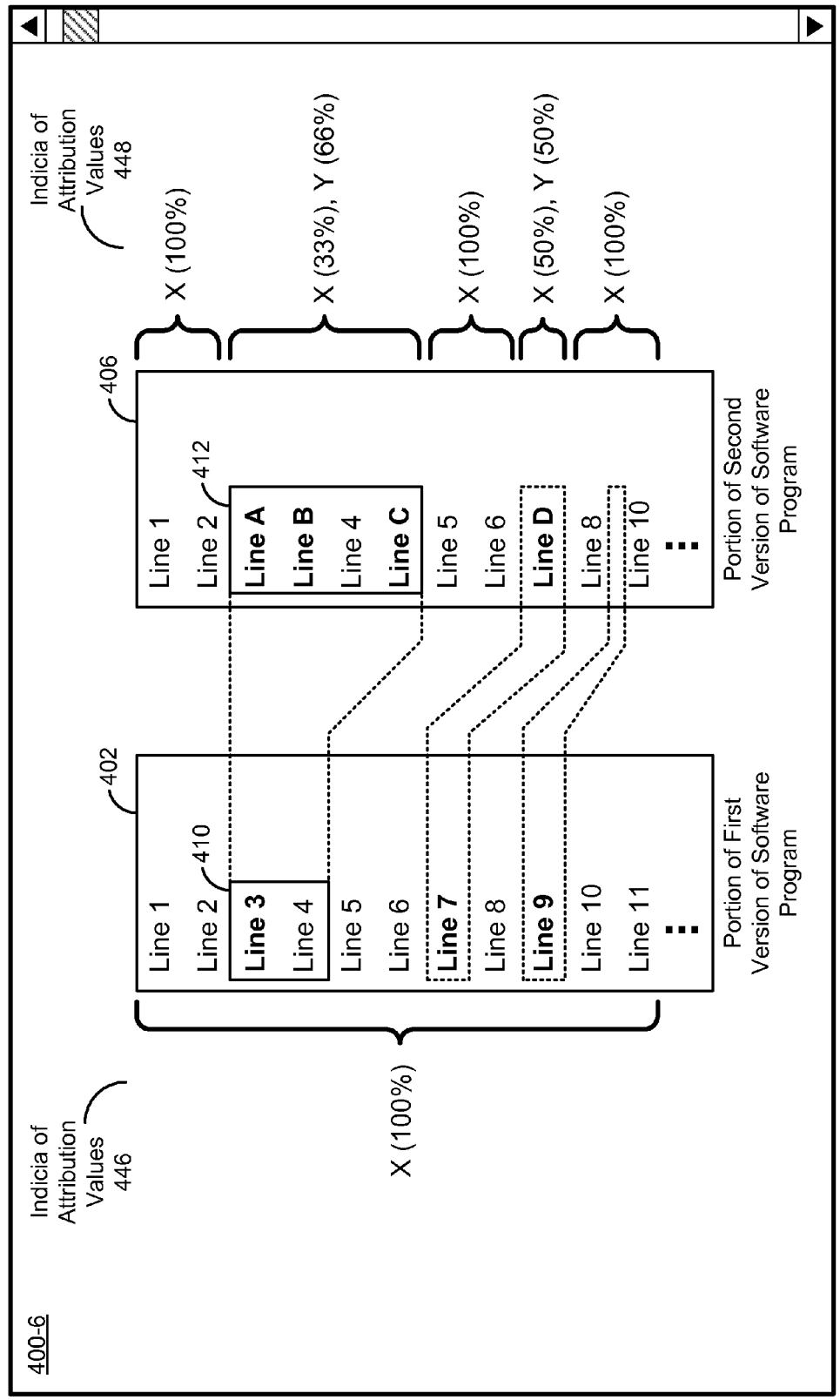
Figure 4G:
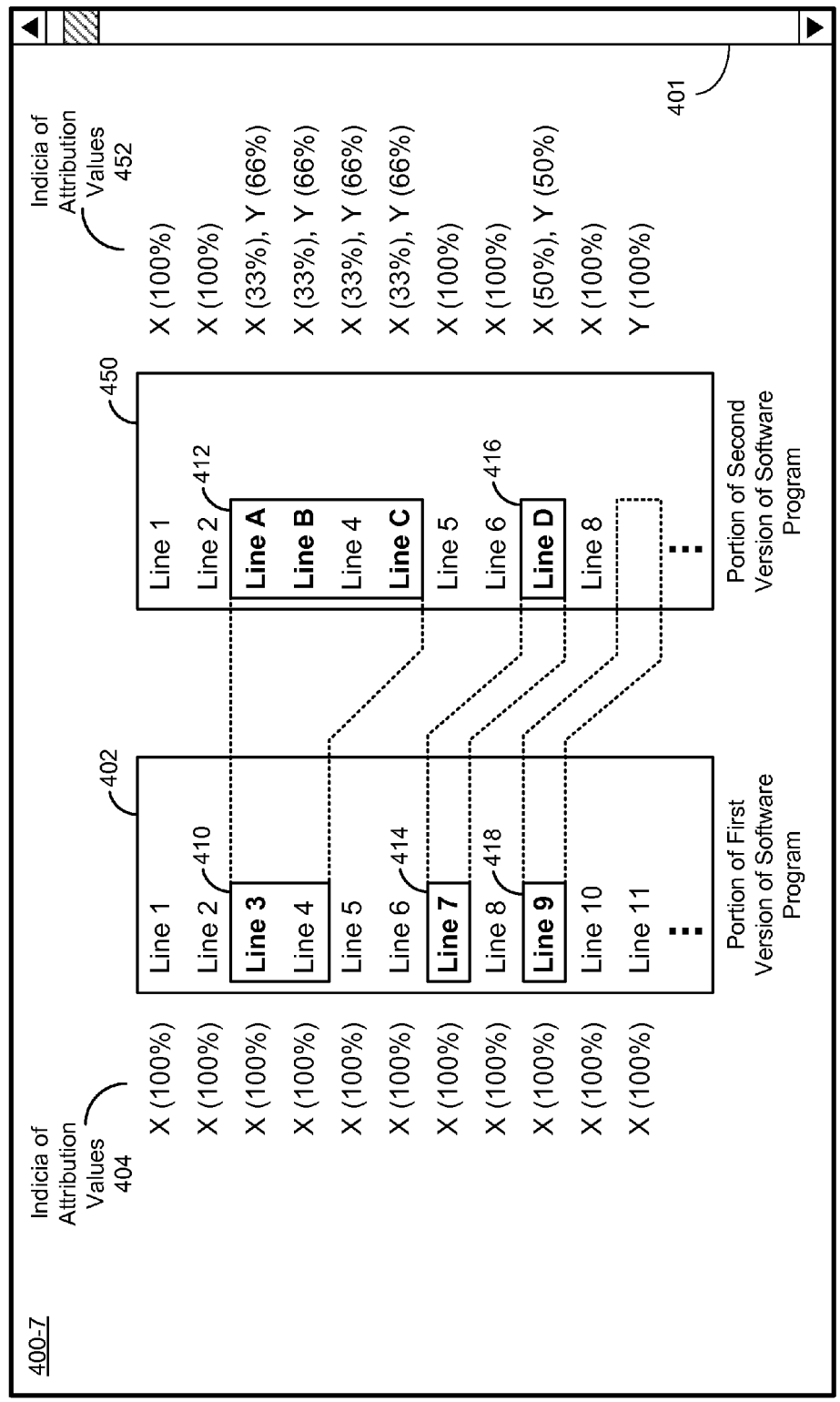

In FIG. 4F, user interface 400-6 displays the portion of the first version of the software program 402 and the portion of the second version of the software program 406, as described above with respect to FIG. 4A. Once again, the attribution values underlying the displayed indicia in FIG. 4F are the same as those underlying the displayed indicia in FIG. 4A. Similar to the description of FIG. 4E, in FIG. 4F, the indicia of attribution values 446 and 448 are displayed for segments as a whole, and not for each line in the segments. However, instead of only indicating one author for each segment as shown in FIG. 4E, FIG. 4F includes indicia of attribution values for each author of a given segment. For example, segment 412 is displayed in conjunction with indicia of the attribution values for both author X and author Y (e.g., "X (33%), Y (66%)").

Figure 5A:
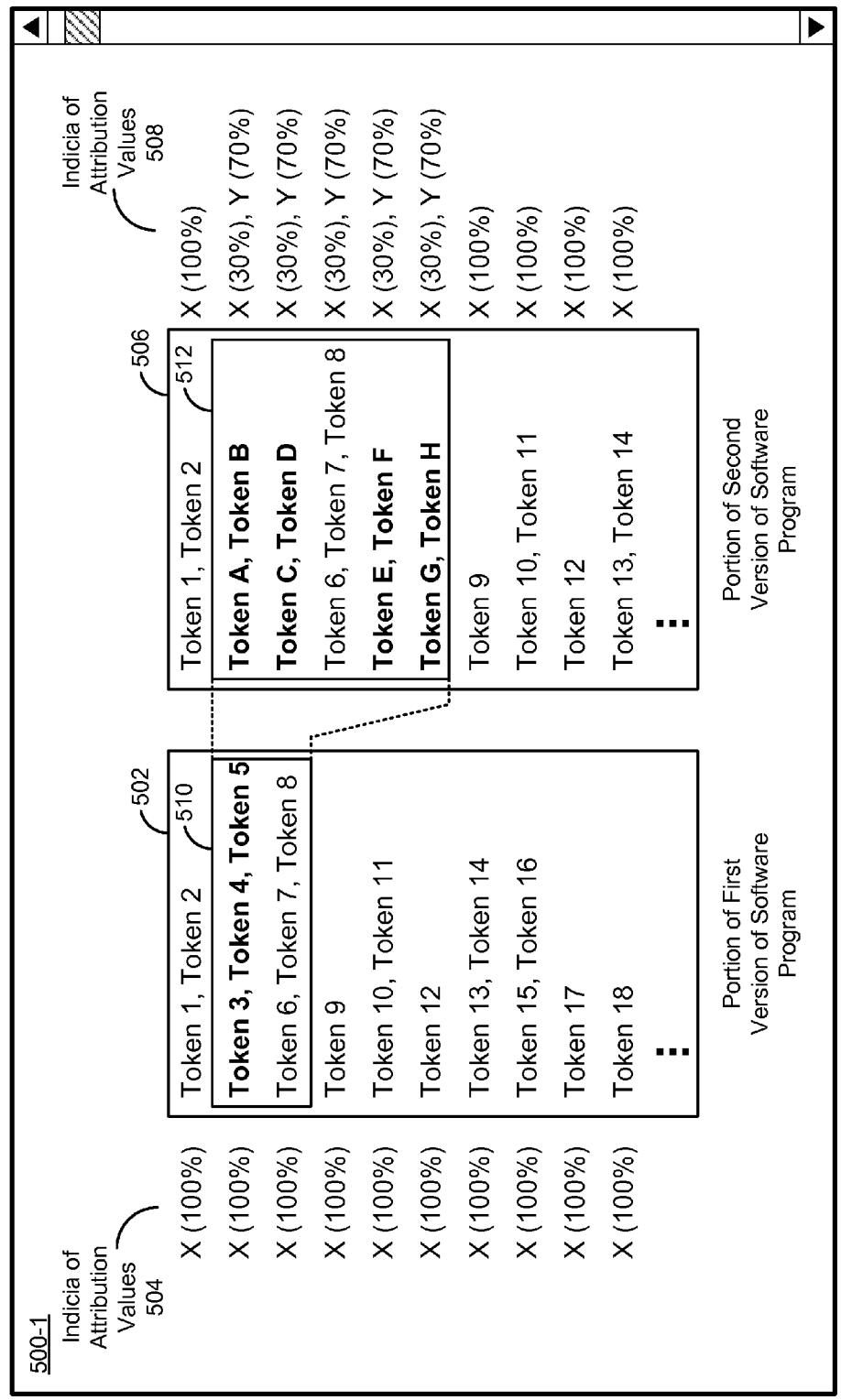

In FIG. 5A, user interface 500-1 displays a portion of a first version of a software program 502 and a portion of a second version of the software program 506, where the second version of the software program has been revised as compared to the first version of the software program. Like FIGS. 4A-4G, the displayed portions of the software program in FIGS. 5A-5B represent source code (e.g., two source code files corresponding to consecutive versions of the software program).

Figure 5B:
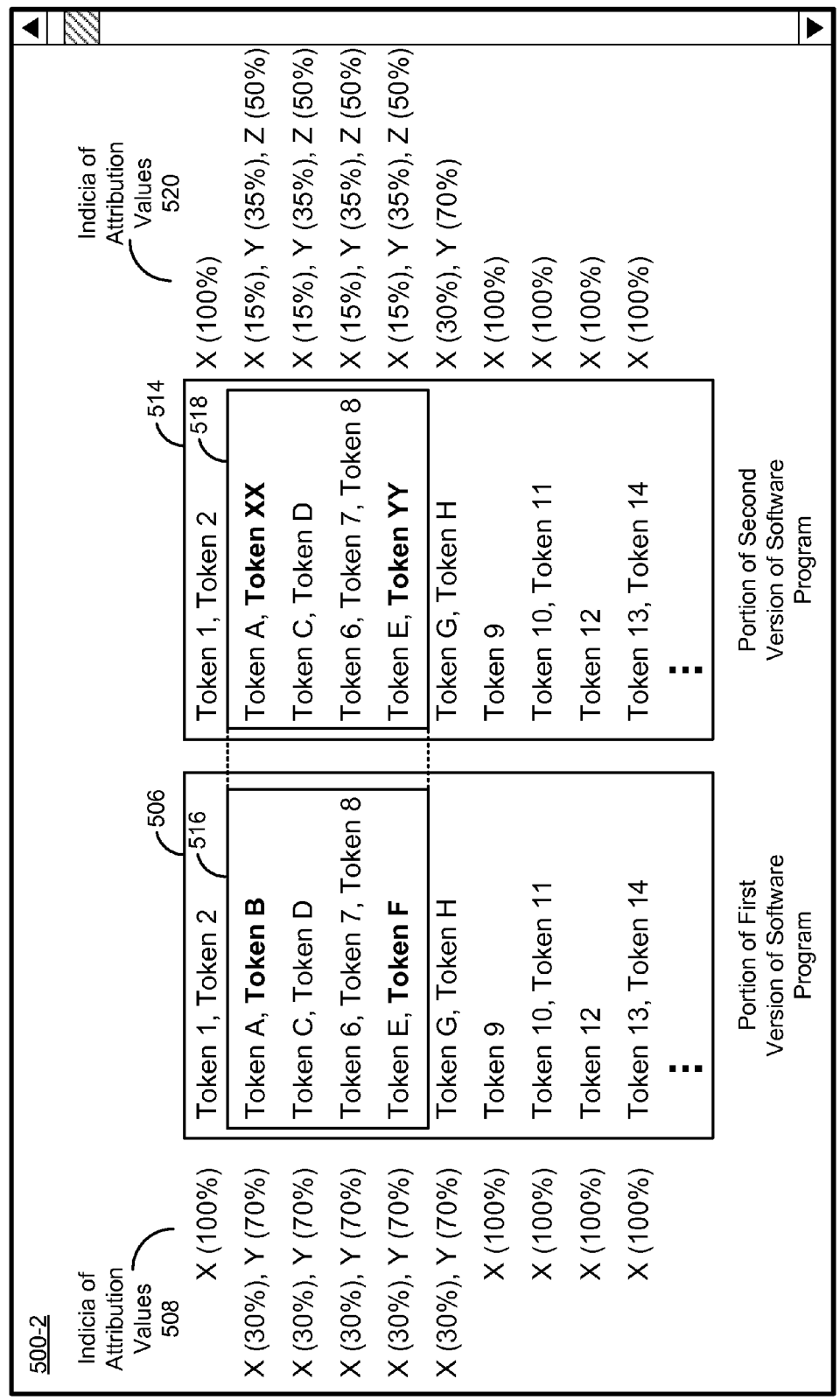

Whereas the attribution values underlying FIGS. 4A-4G are based on the number of lines that have been changed, added, and/or removed between different versions of the software program, the attribution values in FIGS. 5A-5B are based on a number of tokens changed, added, and/or removed between different versions of the software program. In some embodiments, a token is a basic lexical building block of source code, such as an identifier, a reserved word, an operator, a separator, or a constant.

The user interface 500-1 also includes indicia of attribution values 504 for an author X associated with the first version of the software program 502, and indicia of attribution values 508 for authors X and Y associated with the second version of the software program 506. Each line in the portion of the first version of the software program is associated with an attribution value for author X of 100%, thus indicating that each displayed line was written entirely by author X.

For lines of the source code in the second version 506 that have not changed relative to corresponding segments in the first version 502, the indicia of the attribution values remains the same for both versions. For segments in the second version of the software program 506 that have changed relative to corresponding segments in the first version 502, two attribution values are displayed: one that indicates the attribution value for the author of the first version and one that indicates the attribution value for the author who made the revisions to the first version.

As noted above, however, the attribution values underlying the indicia in FIG. 5A are based on the number of tokens that have been changed, added, or removed between different versions of the software. In particular, with respect to segment 512, author Y is responsible for the addition of eight tokens to, and the deletion of three tokens from, segment 510. Accordingly, attribution values for author X and author Y for segment 512 are based on these token-level changes to the source code, resulting in attribution values of 30% for author X and 70% for author Y. Exemplary techniques and formulas for determining attribution values are described herein.

Similar to the discussion above with respect to FIG. 4A, in FIG. 5A, the attribution values are determined for the segment as a whole, but are displayed for each line within the segment. In particular, for the line in segment 512 including "Token A, Token B," the attribution value for author X, namely "X (30%)," does not necessarily indicate that either Token A or Token B was written by or otherwise attributable to author X. Rather, the attribution values are determined based on all of the differences between segments 512 and 510 (e.g., a number of tokens that have been added, removed, or changed), and the attribution values for the segment as a whole are displayed in conjunction with each line.

In FIG. 5B, user interface 500-2 displays the portion of the second version of the software program 506 and a portion of a third version of the software program 514, where the portion of the third version of the software program 514 has been revised as compared to the second version of the software program 506. In particular, while the displayed portion of the second version of the software program 506 includes attribution values for two authors (author X and author Y), the displayed third version of the software program 514 includes attribution values for three authors (author X, author Y, and author Z), reflecting the fact that the third version includes revisions written by author Z.

In particular, the third version 514 includes segment 518 that corresponds to segment 516 in the second version 506. In segment 518, author Z removed two tokens from, and added two tokens to, segment 516. Accordingly, indicia of attribution values 520 for the third version 514 reflect the difference between the corresponding segments, where the attribution values for authors X and Y are modified, and an attribution value for author Z is added. The resulting attribution values for segment 518, namely, "X (15%)," "Y (35%)," "Z(50%)," indicate (approximately) the relative contributions of authors X, Y, and Z to segment 518, and indicate that these users likely all have some knowledge of segment 518.

The attribution values for segment 518 are determined for the segment as a whole, but are displayed for each line within the segment. Thus, for example, the line including "Token C, Token D" in segment 518 is displayed in conjunction with an attribution value for author Z, namely "Z (50%)," even though these lines were not revised by author Z. Alternative techniques for displaying indicia of attribution values, such as those described above with respect to FIGS. 4C-4G, are likewise applicable to the user interfaces 500-1, 500-2.

In some embodiments, attribution values are determined based on the number of tokens in a segment of source code in a first version of a software program and a corresponding segment of source code in a second version of the software program, where the corresponding segment of source code in the second version of the software program has changed (e.g., has been revised) relative to the segment of source code in the first version of the software program. In some embodiments, as described above (and as shown in FIGS. 5A-5B), attribution values are determined based on the number of tokens added to and/or deleted from the segment of source code in the first version of the software program to create the corresponding revised segment in the second version of the software program. For example, in some embodiments, the similarity between a segment of source code in a first version of a software program and a corresponding segment of source code in a second version of the software program is defined as:

$$\text{Similarity} = \frac{\text{MIN}((1 + T_{deleted}), (1 + T_{added}))}{(1 + T_{deleted}) + (1 + T_{added})} \quad (4)$$

where:
Similarity is a value representing a similarity between corresponding segments of software code;

$T_{deleted}$ is the total number of tokens deleted from the segment of source code in the first version of the software program;

$T_{added}$ is the total number of tokens added to the corresponding segment of source code in the second version of the software program; and MIN ($T_{deleted}$, $T_{added}$) is the lesser of value $T_{deleted}$ or $T_{added}$.

Using an example from FIG. 5a, the total number of tokens deleted from segment 510 is 3 ($T_{deleted}$=3), and the total number of tokens added to segment 512 is 8 ($T_{added}$=8). Substituting these values into formula (4) gives the result:

$$\text{Similarity}_{510,512} = \frac{(1+3)}{(1+3)+(1+8)} = 0.30$$

Attribution values for authors (e.g., revising authors and prior authors) are determined using formulas (2) and (3), described above. Thus, continuing the example using segments 510 and 512 from FIG. 5A, formula (2) is used to determine the attribution value of author Y, as author Y is the author that revised segment 510 resulting in segment 512. Because author Y did not have a prior attribution value for segment 510, the prior attribution value, PriorAttrib$_{RA}$, is zero. Accordingly, substituting the appropriate values into formula (2) gives the result:

Attrib$_{Author\ Y}$=(0.30*0)+(1−0.30)=0.70

Thus, the attribution value for author Y for segment 512 is 0.70, or 70%.

Formula (3) is used to determine the attribution value of author X, as author X is an author of segment 510, and author X did not revise segment 510 to create segment 512. Because author X was the sole author of segment 510, the PriorAttrib$_{PA}$ is 1.0 (e.g., 100%). Accordingly, substituting the appropriate values into formula (3) gives the result:

Attrib$_{Author\ X}$=(0.30*1)=0.30

Thus, the attribution value for author X for segment 512 is 0.30, or 30%. The attribution values according to formulas (1)-(3) are reflected in FIG. 5A, which displays the attribution value of 30% for author X and 70% for author Y.

FIG. 5B illustrates an example where the prior version of a segment was already associated with attribution values of a plurality of authors. Specifically, segment 516 is displayed in conjunction with attribution values for author X ("X (30%)") and author Y ("Y (70%)"), indicating, for example, that segment 516 is not the initial version of the segment, but rather has already been revised by either author X or author Y. As described above, segment 516 corresponds to a portion of segment 512 in FIG. 5A.

In FIG. 5B, segment 518 corresponds to a revised version of segment 516, having been revised by author Z. In particular, author Z revised segment 516 by deleting "Token B" and "Token F," and adding "Token XX" and "Token YY," editing resulting in segment 518. Substituting values into formulas (1)-(3), above, attribution values for segment 518 for authors X, Y, and Z are calculated as follows:

$$\text{Similarity}_{516,518} = \frac{3}{3+3} = 0.5$$

Attrib$_{Author\ Z}$ = (0.5 * 0) + (1 − 0.5) = 0.5

Attrib$_{Author\ X}$ = (0.5 * .30) = 0.15

Attrib$_{Author\ Y}$ = (0.5 * .70) = 0.35

Thus, for segment 518, the attribution value for author Z is 0.5, or 50%, the attribution value for author X is 0.15, or 15%, and the attribution value for author Y is 0.35, or 35%. FIG. 5B illustrates these attribution values in association with segment 518.

In FIG. 6A, user interface 600-1 includes a portion of a first version of a software program 602 and a portion of a second version of the software program 604, where the portions of the software program include exemplary source code. The user interface 600-1 also includes indicia of attribution values 603 corresponding to the displayed lines of source code in the first version of the software, and indicia of attribution values 605 corresponding to the displayed lines of source code in the second version of the software. In some embodiments, the indicia of attribution values 603 and 605 in FIG. 6A are determined in accordance with the techniques described above with respect to FIG. 4A. In particular, for a given segment, they are based on the number of lines that have been added, removed, and/or changed with respect to a corresponding segment in an earlier version of the software program.

Figure 6B:
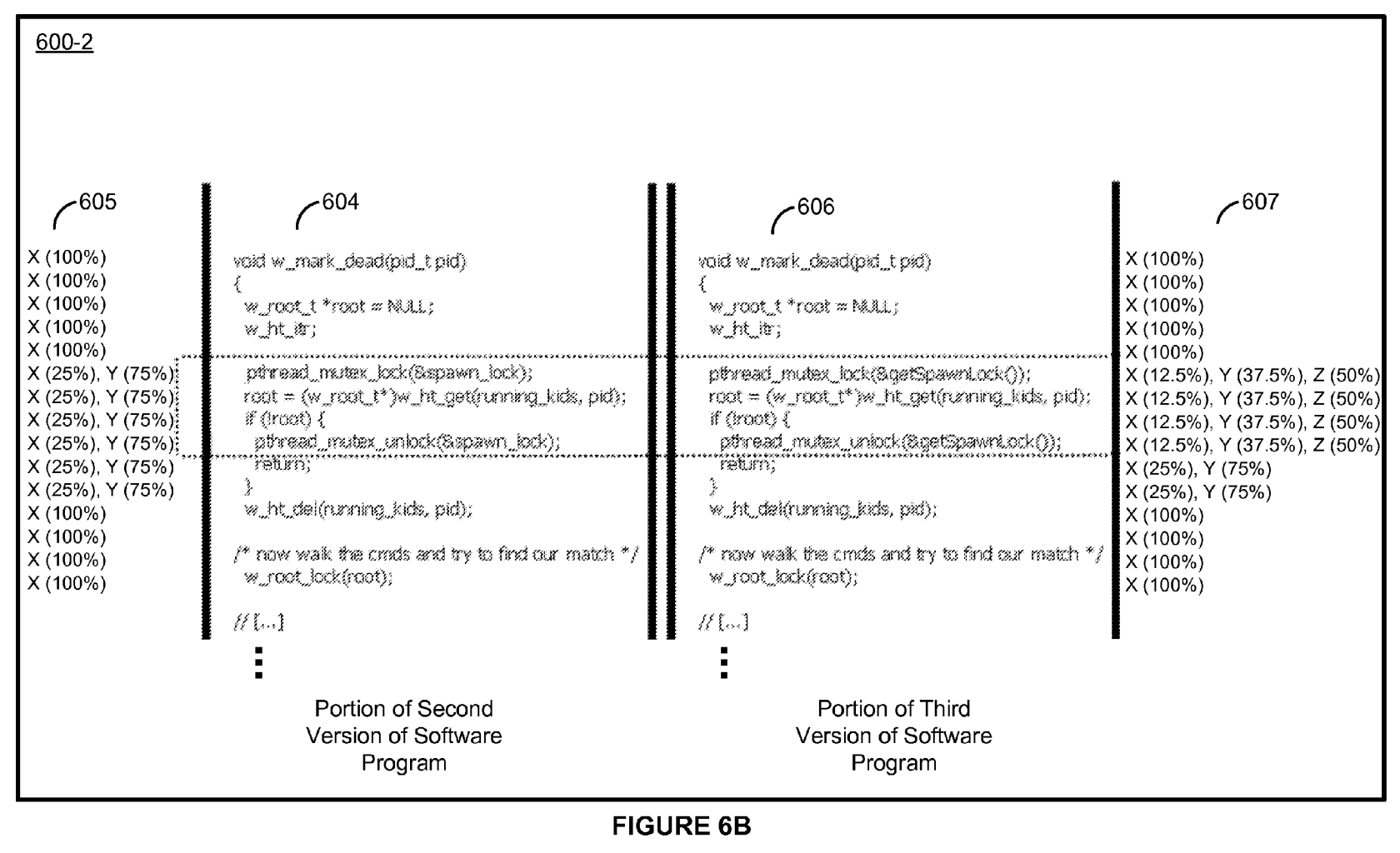

In FIG. 6B, user interface 600-2 includes the portion of the second version of the software program 604 and a portion of a third version of the software program 606, where the portions of the software program include exemplary source code. In FIG. 6B, the portion of the third version of the software program 606 includes revisions that were written by a third author, author Z. Accordingly, the indicia of attribution values 607 indicate (approximately) the contribution of author Z to the software program.

Figure 7A:
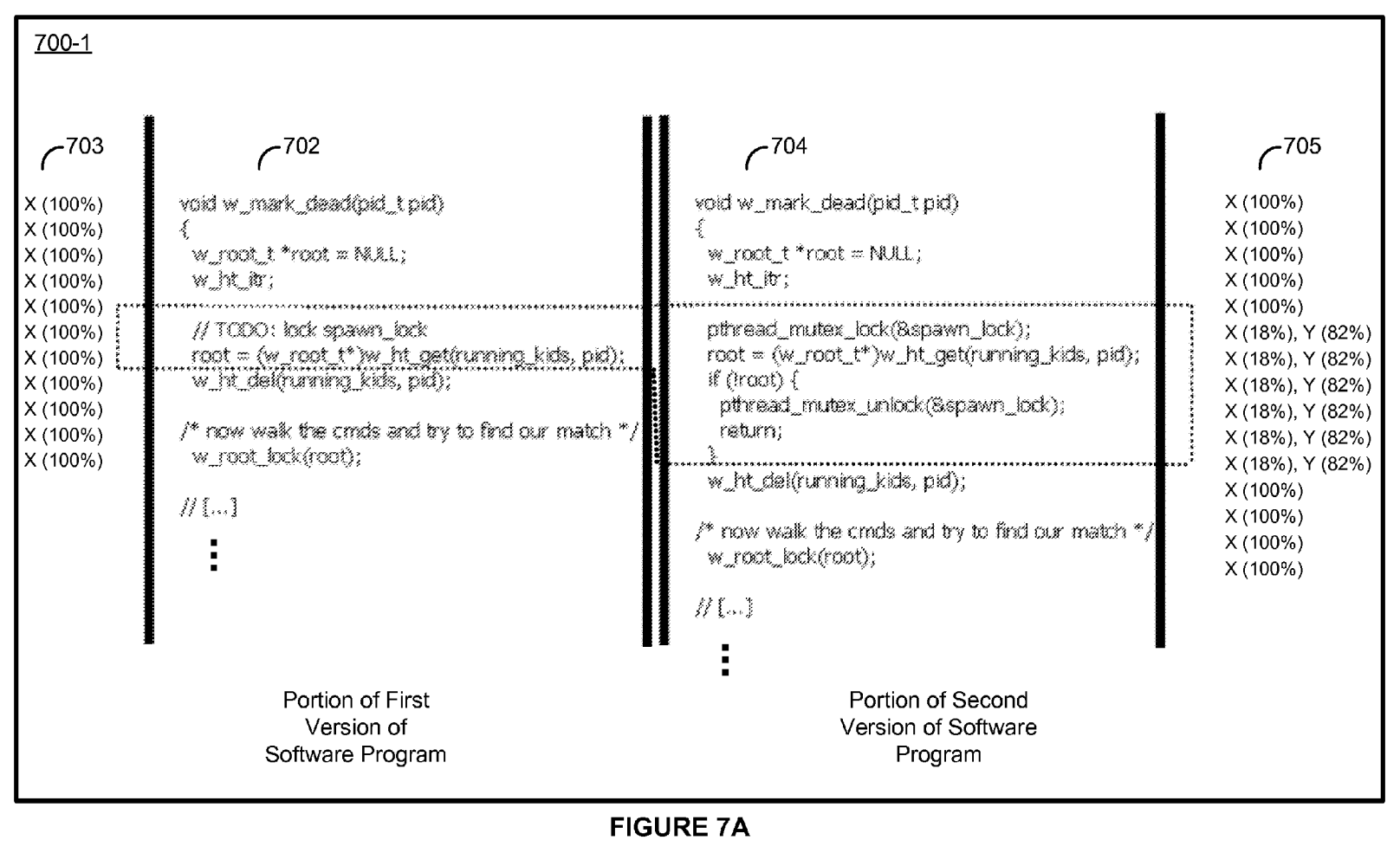

In FIG. 7A, user interface 700-1 includes a portion of a first version of a software program 702 and a portion of a second version of the software program 704, where the portions of the software program include exemplary source code. The user interface 700-1 also includes indicia of attribution values 703 corresponding to the displayed lines of source code in the first version of the software, and indicia of attribution values 705 corresponding to the displayed lines of source code in the second version of the software. In some embodiments, the indicia of attribution values 703 and 705 in FIG. 7A are determined in accordance with the techniques described above with respect to FIG. 5A. In particular, for a given segment, they are based on a number of tokens that have been added, removed, and/or changed with respect to a corresponding segment in an earlier version of the software program.

Figure 7B:
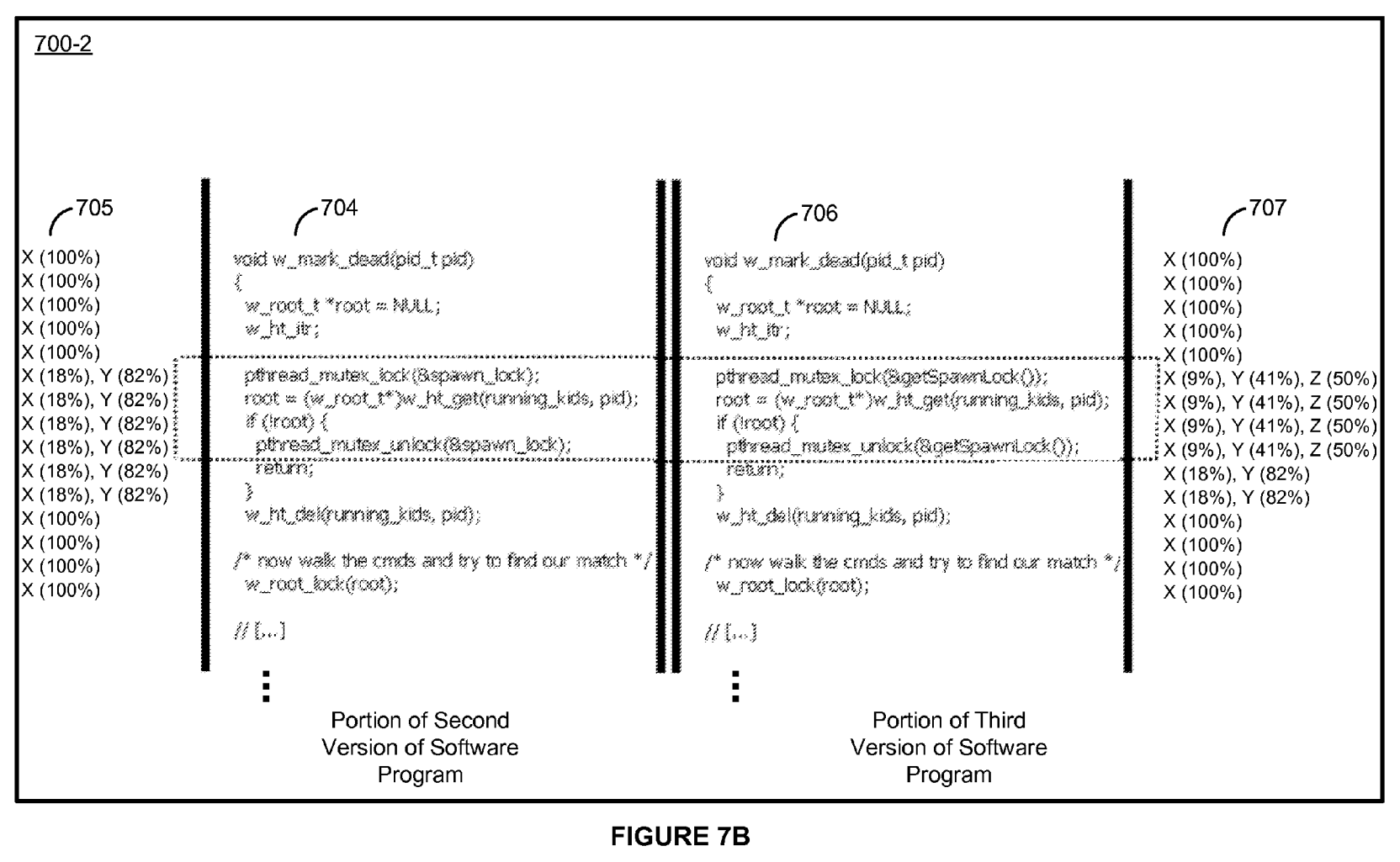

In FIG. 7B, user interface 700-2 includes the portion of the second version of the software program 704 and a portion of a third version of the software program 706, where the portions of the software program include exemplary source code. In FIG. 7B, the portion of the third version of the software program 706 includes revisions that were written by a third author, author Z. Accordingly, the indicia of attribution values 707 reflect the contribution of author Z to the software program. Note that the attribution values 707 for authors X, Y, and Z in FIG. 7B are different than the attribution values 607 for authors X, Y, and Z in FIG. 6B—even though the changes in source code between 706 and 704 are the same as the changes in source code between 606 and 604. This difference in attribution values is due to the difference in the manner in which the attribution values was calculated (i.e., an exemplary line-based calculation versus an exemplary token-based calculation, as explained above). Note that while attribution values are calculated precisely (and automatically), the values themselves are often just approximate indicators of the contribution made by a particular author to a particular segment, especially if the segment has more than one author. These approximate indicators are nevertheless suitable for their purpose; they are typically used to provide an indication of the author(s) who are most knowledgeable about a particular segment of source code. For example, the attribution values "X (18%), Y (82%)" in 705 and "X (25%), Y (75%)" in 605 both indicate that author Y is probably the most knowledgeable author about the corresponding segment of source code. Here, the difference between Y (82%) and Y (75%) is not meaningful, because the difference simply reflects two different ways of calculating the attribution value for author Y.

FIGS. 8A-8G are flow diagrams illustrating a method 800 of attributing authorship to segments of source code in accordance with some embodiments. In some embodiments, the method 800 is performed on a standalone device (e.g., client 104, where client 104 is acting as a standalone device). In some embodiments, the method 800 is performed by a server device (e.g., revision control server system 108) that sends information to a client for display. In some embodiments, the method 800 is performed in part by a client device (e.g., client 104) and in part by a server device (e.g., revision control server system 108). For ease of reference, the method 800 will be described below as being performed simply by a device. It will be understood that, in various embodiments, steps of the method 800 are performed by any of the aforementioned devices or combination of devices. FIGS. 8A-8G correspond to instructions stored in a computer memory or computer readable storage medium (e.g., memory 206 of the revision control server system 108 and/or memory 306 of the client device 104).

The device accesses (806) a comparison of at least a portion of a second version of a software program to a corresponding portion of a first version of the software program. In some embodiments, the device accesses a comparison of the entire second version of the software program to the entire first version of the software program. In some embodiments, the portion of the second version of the software program is user-selected.

The first version of the software program was written by a first author (e.g., author X in FIGS. 4A-7B). In some embodiments, the first version of the software program was written by more than one author.

The portion of the second version of the software program includes revisions relative to the corresponding portion of the first version of the software program, the revisions including segments of source code (e.g., particular lines, blocks, paragraphs, functions, methods, or classes in the source code) in the second version of the software program that have changed relative to corresponding segments of source code in the first version of the software program. A version of a program "includes" revisions if the version has been revised as compared to a previous version of the program. In some embodiments, the revisions are contained in segments of source code in the second version of the software program that have changed relative to corresponding segments of source code in the first version of the software program.

The revisions to the corresponding portion of the first version of the software program were written by a second author (e.g., author Y in FIGS. 4A-7B).

In some embodiments, the comparison identifies (808) the segments of source code in the second version of the software program that have changed relative to corresponding segments of source code in the first version of the software program.

In some embodiments, the first version of the software program corresponds to a first commit of the software program in a revision control system, and the second version of the software program corresponds to a subsequent commit of the software program in the revision control system (810). In some embodiments, another version of the software program is created with each commit (i.e., save) of the software program in the revision control system.

In some embodiments, the first author is a creator of all of the lines of source code of the first version of the software program (812). In other words, the first author is the initial author or the initial creator of the software program, and the first version of the software program is the initial version of the software program. In some embodiments, the first version of the software program is not the initial version of the software program. In such cases, the first author is one author of the first version of the software program, and does not necessarily correspond to the initial author of the software program.

In some embodiments, as shown above in FIG. 4A, the creator (i.e., the initial author of a software program or of particular lines of source code in an existing software program) is given a maximum initial attribution value (e.g., 100%). In some embodiments, the author of a respective version of the software program (other than the initial version of the software program) is the user who created the respective version of the software program by making changes/revisions to a version of the software program immediately preceding the respective version of the software program, and then saving/committing the changes/revisions. The respective version of the software program is created as a result of execution of the save/commit command with respect to the changed/revised version.

In some embodiments, prior to accessing the comparison (at 806), the device identifies (802) segments of source code in the second version of the software program that have changed relative to corresponding segments of source code in the first version of the software program. In some embodiments, the program or module that compares the first and second versions of the software program is separate from the program or module that determines the attribution values for the authors. In some embodiments, the program or module that compares the first and second versions of the software program is the same as the program or module that determines the attribution values for the authors.

In some embodiments, prior to accessing the comparison (at 806), the device identifies (804) one or more differences between the segments of source code in the portion of the second version of the software program that have changed relative to corresponding segments of source code in the first version of the software program. In some embodiments, prior to accessing the comparison (at 806), the device identifies one or more differences between the segments of source code in the second version of the software program that have changed relative to corresponding segments of source code in the first version of the software program. In some embodiments, identifying the differences includes: identifying one or more deleted lines; identifying one or more added lines; identifying one or more modified lines; and/or identifying one or more replaced lines (which may be characterized as a deletion of a line plus an insertion of a new line). In some embodiments, identifying the differences includes: identifying one or more deleted tokens; identifying one or more added tokens; identifying one or more modified tokens; and/or identifying one or more replaced tokens (which may be characterized as a deletion of a token plus an insertion of a new token).

Figure 8A:
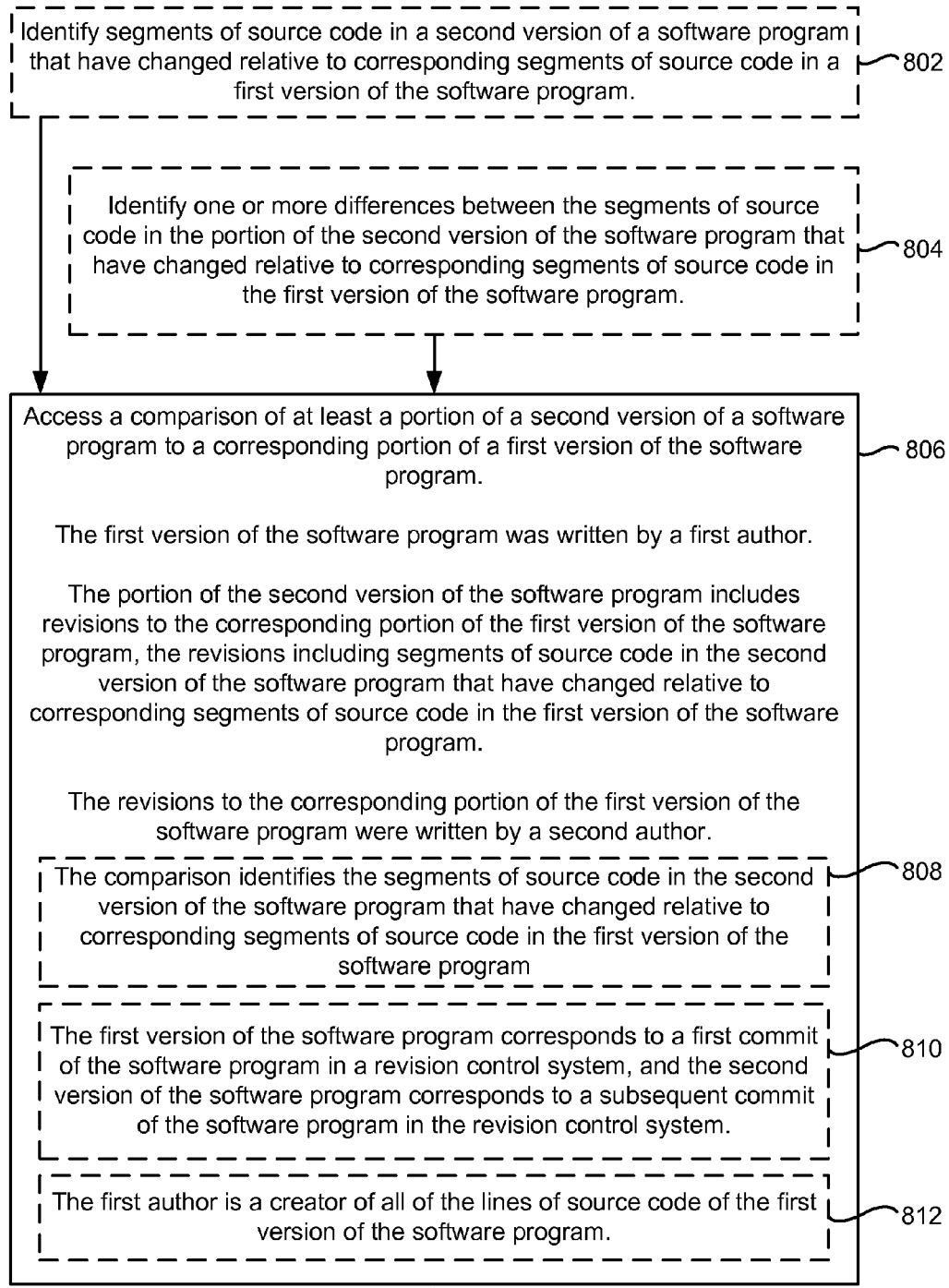
FIGS. 8A-8G are flow diagrams illustrating a method of attributing authorship to segments of source code in accordance with some embodiments.
Figure 8B:
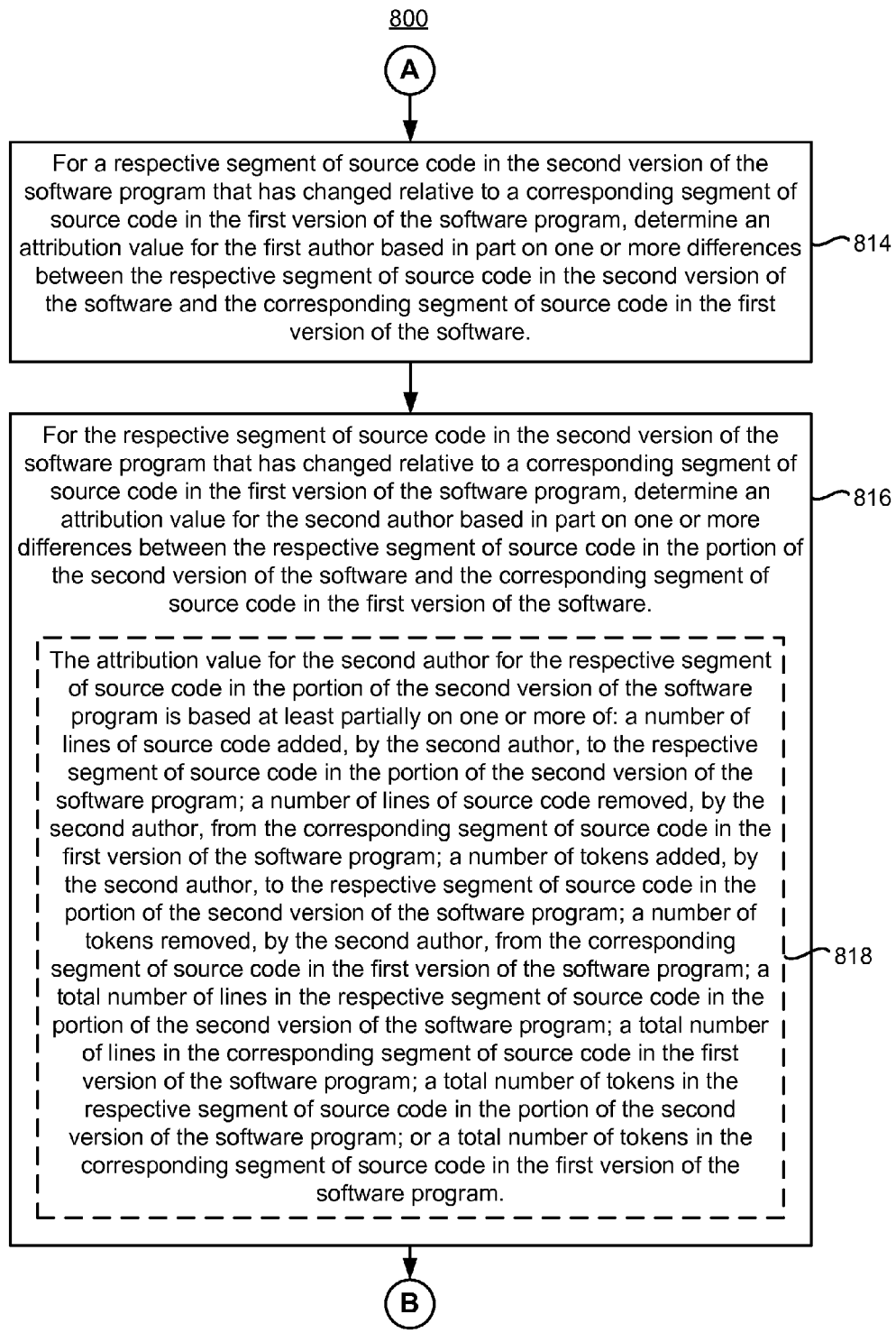

With reference to FIG. 8B, for a respective segment of source code in the second version of the software program that has changed relative to a corresponding segment of source code in the first version of the software program, the device determines (814) an attribution value (e.g., a numerical score, a percentage value, a letter grade, etc.) for the first author based in part on one or more differences between the respective segment of source code in the second version of the software and the corresponding segment of source code in the first version of the software (e.g., based on the number of tokens and/or lines that have been added, removed, and/or changed).

For the respective segment of source code in the second version of the software program that has changed relative to a corresponding segment of source code in the first version of the software program, the device determines (816) an attribution value for the second author based in part on one or more differences between the respective segment of source code in the portion of the second version of the software and the corresponding segment of source code in the first version of the software.

In some embodiments, the attribution value for the second author for the respective segment of source code in the portion of the second version of the software program is based (818) at least partially on one or more of: a number of lines of source code added, by the second author, to the respective segment of source code in the portion of the second version of the software program; a number of lines of source code deleted or modified, by the second author, from the corresponding segment of source code in the first version of the software program; a number of tokens added, by the second author, to the respective segment of source code in the portion of the second version of the software program; a number of tokens deleted or modified, by the second author, from the corresponding segment of source code in the first version of the software program; a total number of lines in the respective segment of source code in the portion of the second version of the software program; a total number of lines in the corresponding segment of source code in the first version of the software program; a total number of tokens in the respective segment of source code in the portion of the second version of the software program; or a total number of tokens in the corresponding segment of source code in the first version of the software program. In some embodiments, the attribution value for the first author is also based at least partially on one or more of these factors.

Figure 8C:
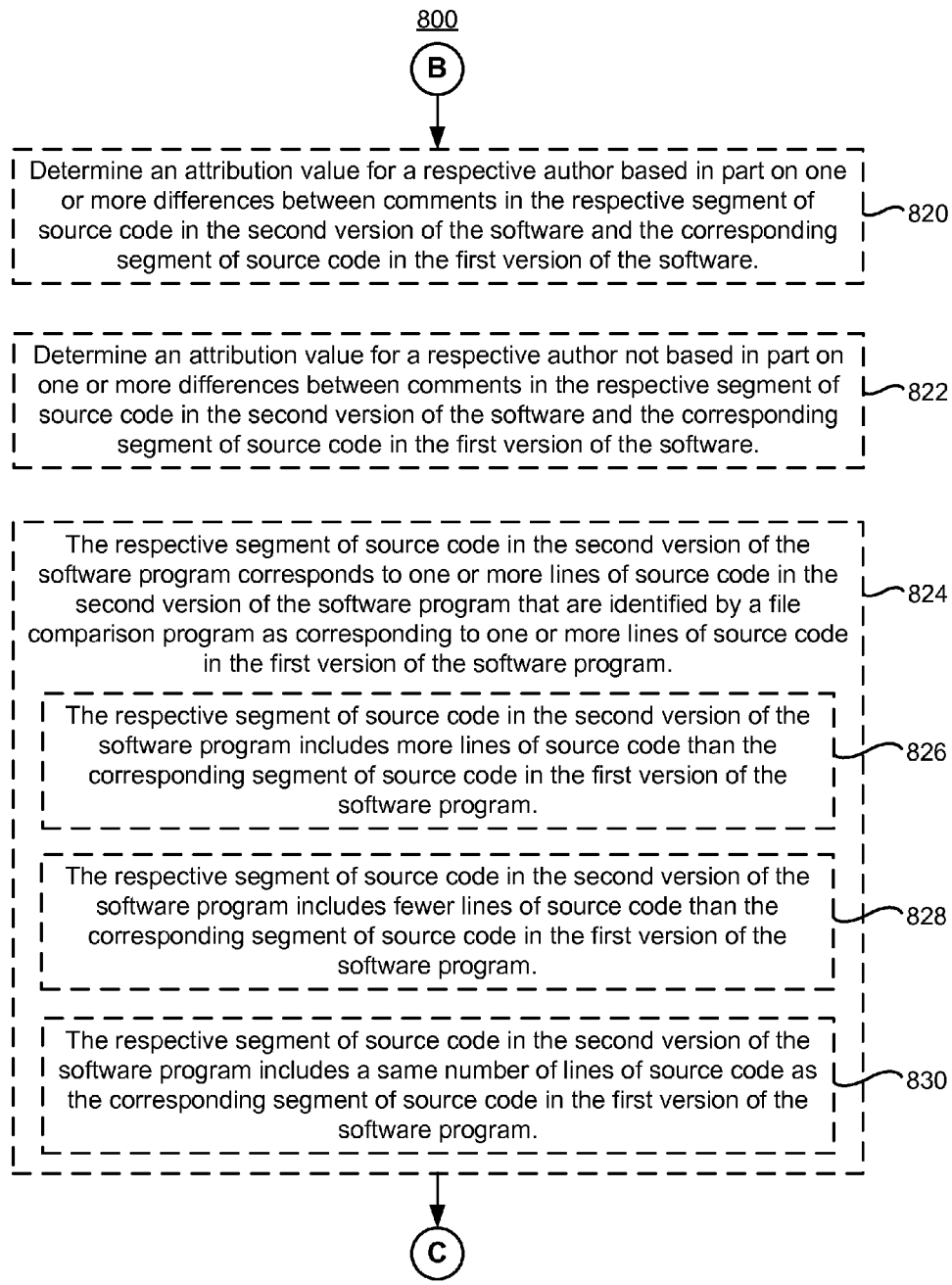

With reference to FIG. 8C, in some embodiments, the device determines (820) an attribution value for a respective author (e.g., at 814, 816) based in part on one or more differences between comments in the respective segment of source code in the second version of the software and the corresponding segment of source code in the first version of the software. In other words, in some embodiments, additions, deletions, and/or changes to comments are considered when determining an attribution value. In some embodiments, comments are textual annotations embedded in source code files of computer programs (e.g., text preceded by a character such as "#" or "/").

In some embodiments, the device determines (822) an attribution value for a respective author (e.g., at steps 814, 816) not based in part on one or more differences between comments in the respective segment of source code in the second version of the software and the corresponding segment of source code in the first version of the software. In other words, in some embodiments, additions, deletions, and/or changes to comments are not considered when determining an attribution value.

In some embodiments, the respective segment of source code in the second version of the software program corresponds to one or more lines of source code in the second version of the software program that are identified by a file comparison program as corresponding to one or more lines of source code in the first version of the software program (824). In some embodiments, the one or more lines of source code in the second version of the software program are revised versions of the one or more lines of source code in the first version of the software program.

In some embodiments, the respective segment of source code in the second version of the software program includes more lines of source code than the corresponding segment of source code in the first version of the software program (826).

In some embodiments, the respective segment of source code in the second version of the software program includes fewer lines of source code than the corresponding segment of source code in the first version of the software program (828).

In some embodiments, the respective segment of source code in the second version of the software program includes a same number of lines of source code as the corresponding segment of source code in the first version of the software program (830).

Figure 8D:
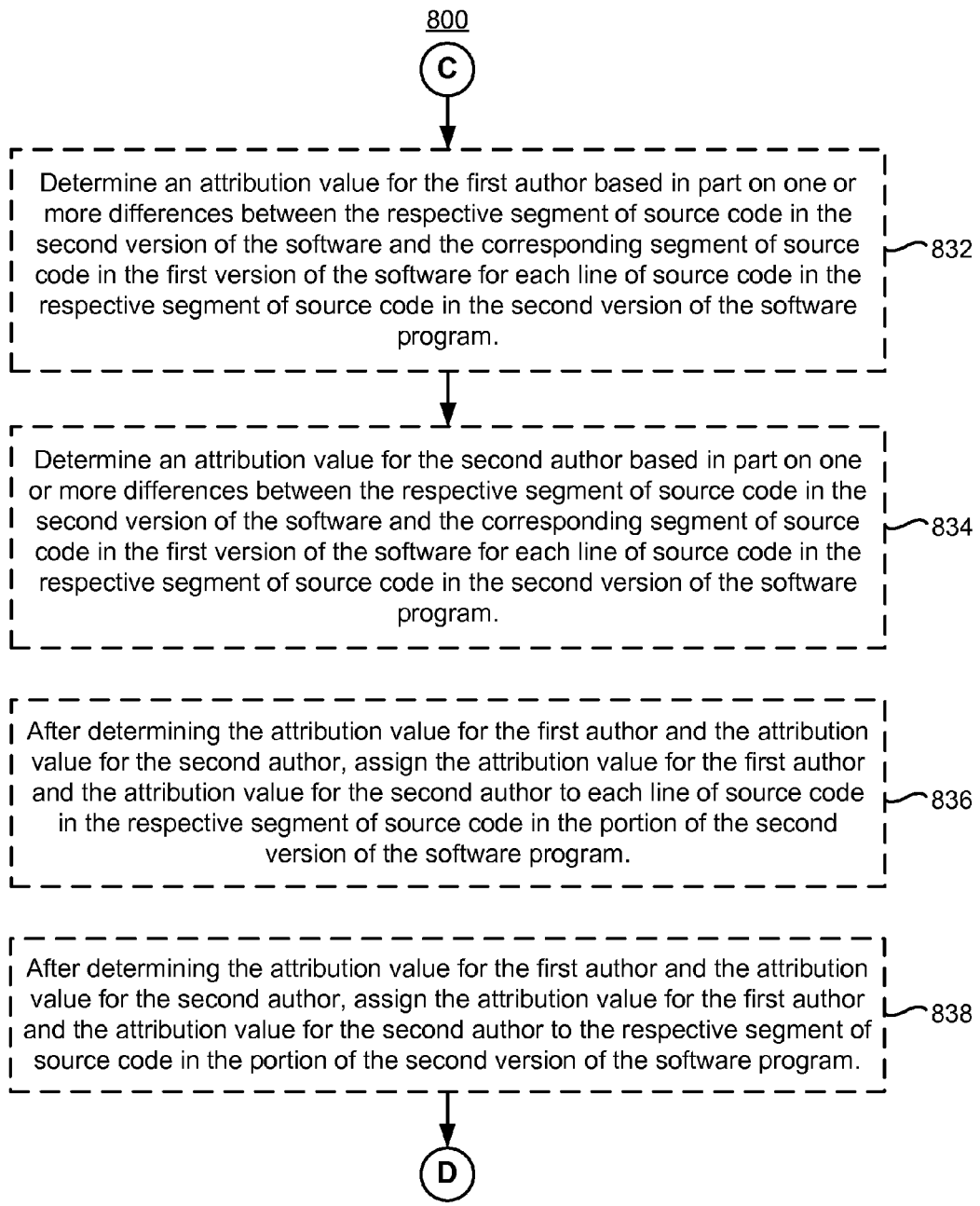

With reference to FIG. 8D, in some embodiments, the device determines (832) an attribution value for the first author based in part on one or more differences between the respective segment of source code in the second version of the software and the corresponding segment of source code in the first version of the software for each line of source code in the respective segment of source code in the second version of the software program. For example, user interface 400-1 in FIG. 4A includes indicia of attribution values for author X (the first author) for each line in segment 412 of the second version of the software program (e.g., "X (33%)"). Similarly, in some embodiments, the device determines (834) an attribution value for the second author based in part on one or more differences between the respective segment of source code in the second version of the software and the corresponding segment of source code in the first version of the software for each line of source code in the respective segment of source code in the second version of the software program. For example, user interface 400-1 in FIG. 4A includes indicia of attribution values for author Y (the second author) for each line in segment 412 of the second version of the software program (e.g., "Y (66%)").

In some embodiments, the device determines author attribution values for each line of source code in a respective version of the software program, including lines of source code that are the same as corresponding lines of source code in the prior version. For example, "Line 6" in the displayed portion of the second version of the software program 406 (in FIG. 4A) is unchanged between the first version of the software and the second version of the software. Yet an indicium of an attribution value for the first author (author X) is displayed alongside "Line 6" in the displayed portion of the second version of the software program 406.

In some embodiments, after determining the attribution value for the first author and the attribution value for the second author, the device assigns (836) the attribution value for the first author and the attribution value for the second author to each line of source code in the respective segment of source code in the portion of the second version of the software program. For example, in FIG. 4A, attribution values for the first and the second authors (author X and author Y) are assigned to each line of source code in segment 412 in the second version of the software program (and indicia of attribution values for the first and the second authors (author X and author Y) are displayed alongside each line of source code in segment 412 in the second version of the software program).

In some embodiments, after determining the attribution value for the first author and the attribution value for the second author, the device assigns (838) the attribution value for the first author and the attribution value for the second author to the respective segment of source code in the portion of the second version of the software program. For example, in FIG. 4F, attribution values for the first and the second authors (author X and author Y) are assigned to segment 412 in the second version of the software program (and indicia of attribution values for the first and the second authors (author X and author Y) are displayed alongside segment 412 in the second version of the software program).

Figure 8E:
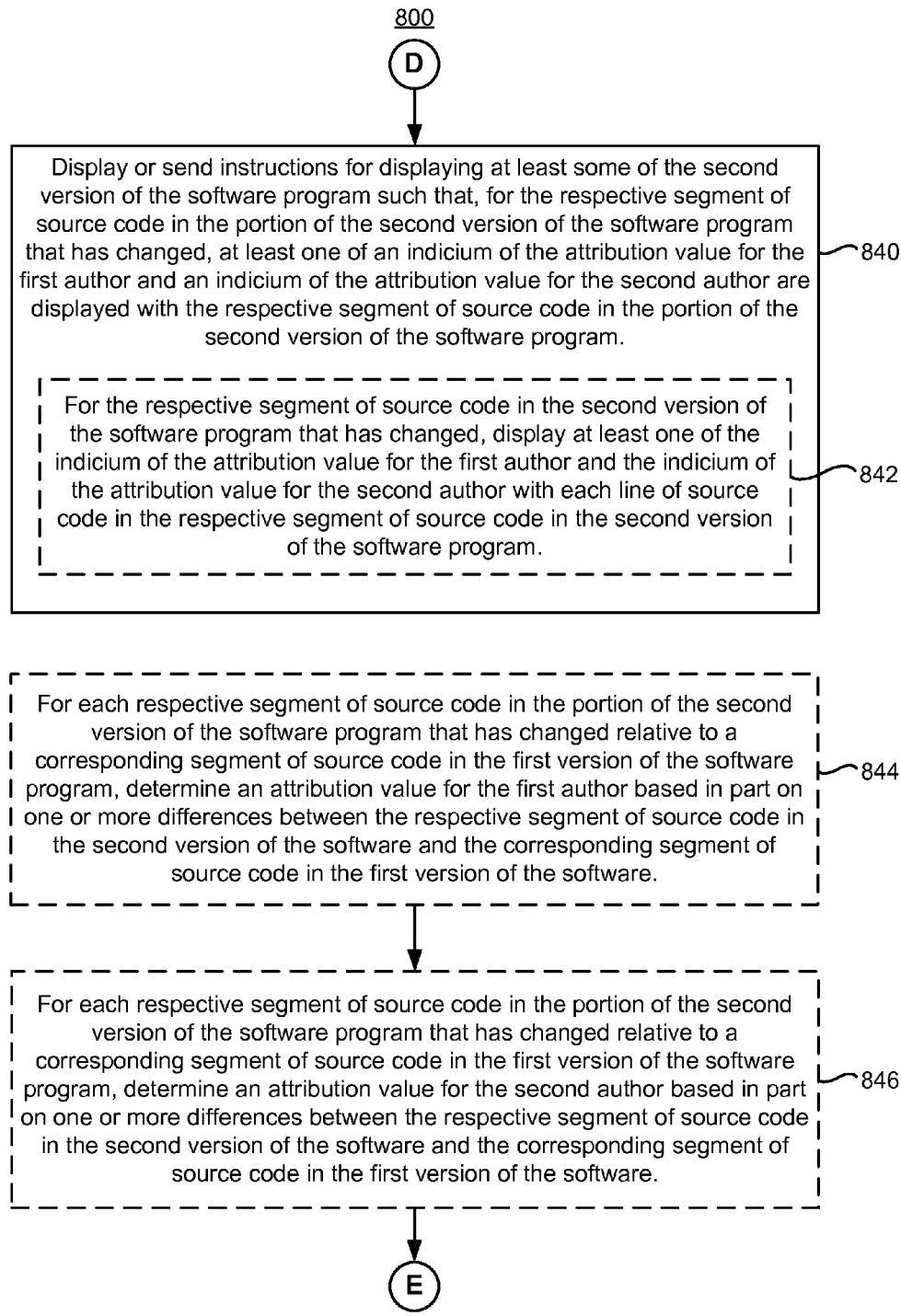

With reference to FIG. 8E, the device displays (e.g., if the method is performed at a client computer or a standalone computer) or sends instructions for displaying (e.g., if the method is performed at a server computer that sends its results for display on a client computer) (840) at least some of the second version of the software program such that, for the respective segment of source code in the portion of the second version of the software program that has changed, at least one of an indicium of the attribution value (e.g., a score, number, letter grade, or one or more symbols) for the first author and an indicium of the attribution value for the second author are displayed with (e.g., alongside or next to) the respective segment of source code in the portion of the second version of the software program. For example, FIG. 4F displays an exemplary indicium of an attribution value for author X, namely "X (33%)" and an exemplary indicium of an attribution value for author Y, namely "Y (66%)" displayed next to the respective segment 412 of source code in the second version of the software program. In some embodiments, the indicium of the attribution value includes the attribution value itself (e.g., the calculated attribution value is displayed). Other exemplary indicia of an attribution value for a respective author include symbols (e.g., stars, as shown in FIG. 4D), scaled or normalized attribution values, and the like.

In some embodiments, the indicium of the attribution value for the first author and the indicium of the attribution value for the second author are values selected from a range, wherein the range is $0 \leq x \leq 1$; $0 \leq x \leq 1$; $0 \leq x \leq 10$; $0 \leq x \leq 10$; $0 \leq x \leq 100$; or $0 \leq x \leq 100$.

In some embodiments, for the respective segment of source code in the second version of the software program that has changed, the device displays (842) at least one of the indicium of the attribution value for the first author and the indicium of the attribution value for the second author with each line of source code in the respective segment of source code in the second version of the software program. For example, in FIG. 4C, an indicium of an attribution value for one of the two authors of segment 412 (in this case, "Y" for author Y) is displayed alongside each line in segment 412.

In some embodiments, both the indicium of the attribution value for the first author and the indicium of the attribution value for the second author are displayed with each line of source code in the respective segment of source code in the second version of the software program. For example, in FIG. 4A, an indicium of the attribution value for author X (the first author) and the indicium of the attribution value for author Y (the second author) are displayed alongside each line in segment 412. Specifically, "X (33%), Y (66%)" appears next to each line in segment 412.

In some embodiments, for a respective segment of source code that has changed, at least one of the indicium of the attribution value for the first author and the indicium of the attribution value for the second author are displayed for the respective segment as a whole. For example, FIG. 4E displays an indicium of an attribution value for one of the two authors of segment 412 (in this case, "Y" for author Y) alongside segment 412 as a whole.

In some embodiments, for a respective segment of source code that has changed, both the indicium of the attribution value for the first author and the indicium of the attribution value for the second author are displayed for the respective segment as a whole. For example, FIG. 4F displays an indicium of an attribution value for author X (the first author) and an indicium of an attribution value for author Y (the second author) alongside segment 412 as a whole. Specifically, "X (33%), Y (66%)" appears next to segment 412.

In some embodiments, for each respective segment of source code in the portion of the second version of the software program that has changed relative to a corresponding segment of source code in the first version of the software program, the device determines (844) an attribution value for the first author based in part on one or more differences between the respective segment of source code in the second version of the software and the corresponding segment of source code in the first version of the software. In some embodiments, for each respective segment of source code in the portion of the second version of the software program that has changed relative to a corresponding segment of source code in the first version of the software program, the device determines (846) an attribution value for the second author based in part on one or more differences between the respective segment of source code in the second version of the software and the corresponding segment of source code in the first version of the software. For example, if a portion of a second version of a software program includes five segments that have changed relative to corresponding portions in a first version of the program, the device determines attribution values (for the authors of both the first and second versions) for all five of the segments.

Figure 8F:
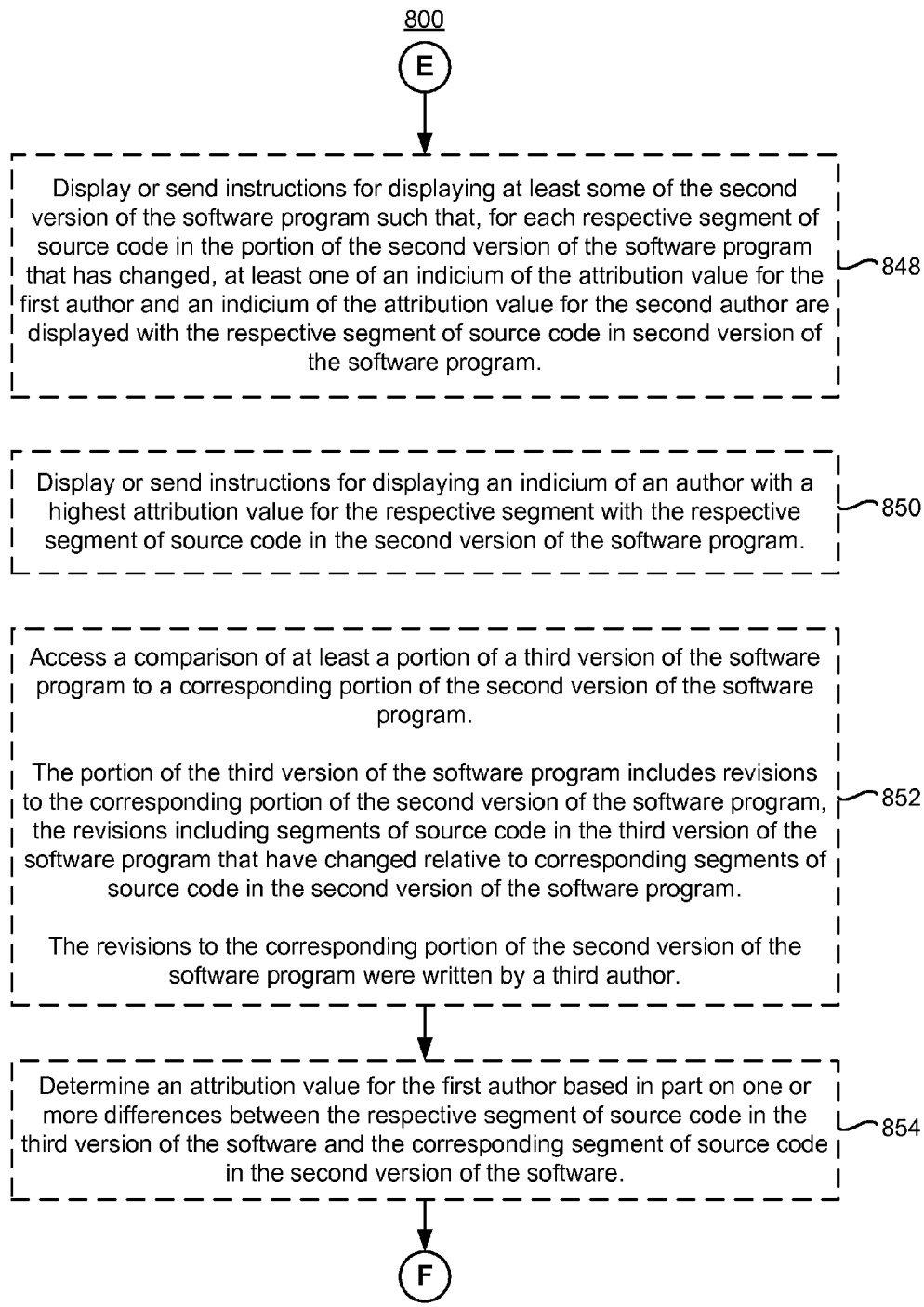

With reference to FIG. 8F, in some embodiments, the device displays (e.g., if the method is performed at a client computer or a standalone computer) or sends instructions for displaying (e.g., if the method is performed at a server computer that sends its results for display on a client computer) (848) at least some of the second version of the software program such that, for each respective segment of source code in the portion of the second version of the software program that has changed, at least one of an indicium of the attribution value for the first author and an indicium of the attribution value for the second author are displayed with the respective segment of source code in second version of the software program. For example, continuing the preceding example, if the portion of a second version of the software program includes five segments that have changed relative to corresponding portions in the first version of the program, the device displays or sends instructions for displaying, for all five of the segments, an indicium of the attribution value of at least one of the authors.

In some embodiments, the device displays (e.g., if the method is performed at a client computer or a standalone computer) or sends instructions for displaying (e.g., if the method is performed at a server computer that sends its results for display on a client computer) (850) an indicium of an author with a highest attribution value for the respective segment with (e.g., alongside or next to) the respective segment of source code in the second version of the software program. For example, user interface 400-5 in FIG. 4E displays an indicium of author Y (e.g., "Y") next to segment 412, indicating that author Y has the highest attribution value for segment 412 (e.g., 66%, as described above). As another example, the indicia of the attribution values 440 in FIG. 4D include stars for each author, where more stars correspond to a higher attribution value. Thus, for segment 412, author Y has the highest attribution value, reflected by an indicium of two stars.

In some embodiments, the device accesses (852) a comparison of at least a portion of a third version of the software program to a corresponding portion of the second version of the software program. In some embodiments, the device accesses a comparison of the (entire) third version of the software program to the (entire) second version of the software program. In some embodiments, the third version of the software program corresponds to a third commit of the software program in a revision control system.

In some embodiments, the portion of the third version of the software program includes revisions to the corresponding portion of the second version of the software program, the revisions including segments of source code (e.g., particular lines, blocks, paragraphs, functions, methods, or classes in the source code) in the third version of the software program that have changed relative to corresponding segments of source code in the second version of the software program. In some embodiments, the revisions are contained in segments of source code in the third version of the software program that have changed relative to corresponding segments of source code in the second version of the software program.

In some embodiments, the revisions to the corresponding portion of the second version of the software program were written by a third author. For example, user interface 400-2 in FIG. 4B displays indicia of attribution values for a third author, author Z, in addition to the first author (author X) and the second author (author Y).

In some embodiments, for a respective segment of source code in the third version of the software program that has changed relative to a corresponding segment of source code in the second version of the software program, the device determines (854) an attribution value (e.g., a numerical score, a percentage value, a letter grade, etc.) for the first author based in part on one or more differences between the respective segment of source code in the third version of the software and the corresponding segment of source code in the second version of the software.

Figure 8G:
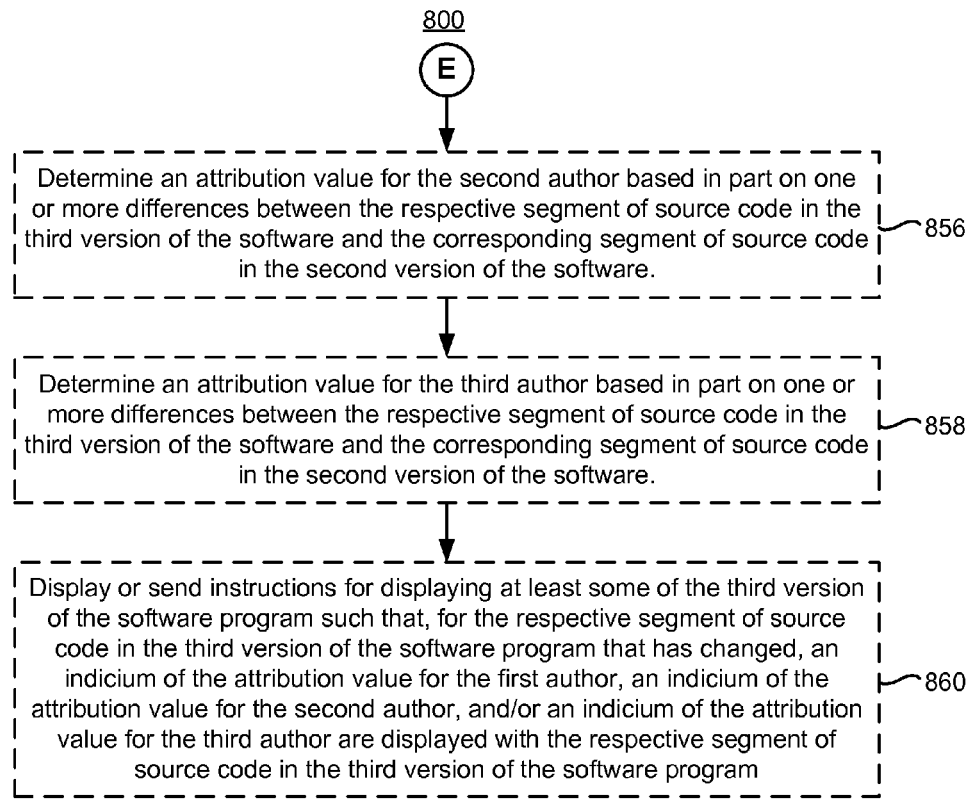

With reference to FIG. 8G, in some embodiments, the device determines (856) an attribution value (e.g., a numerical score, a percentage value, a letter grade, etc.) for the second author based in part on one or more differences between the respective segment of source code in the third version of the software and the corresponding segment of source code in the second version of the software.

In some embodiments, the device determines (858) an attribution value (e.g., a numerical score, a percentage value, a letter grade, etc.) for the third author based in part on one or more differences between the respective segment of source code in the third version of the software and the corresponding segment of source code in the second version of the software. In some embodiments, as described above, the attribution values for the first, second, and third authors are based on the number of tokens and/or lines that have been added, removed, and/or changed.

In some embodiments, the device displays (e.g., if the method is performed at a client computer or a standalone computer) or sends instructions for displaying (e.g., if the method is performed at a server computer that sends its results for display on a client computer) (860) at least some of the third version of the software program such that, for the respective segment of source code in the third version of the software program that has changed, an indicium of the attribution value for the first author, an indicium of the attribution value for the second author, and/or an indicium of the attribution value for the third author are displayed with (e.g., alongside or next to) the respective segment of source code in the third version of the software program. For example, FIG. 4B displays an exemplary indicium of an attribution value for the first author "X (17%)," an exemplary indicium of an attribution value for the second author "Y (33%)," and an exemplary indicium of an attribution value for the third author "Z (50%)," displayed next to the respective segment 430 of source code in the third version of the software program.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art so drawings herein do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A non-transitory computer readable storage medium storing one or more programs, the one or more programs comprising instructions, which, when executed by an electronic device with one or more processors, cause the electronic device to:
    access a comparison of at least a portion of a second version of a software program to a corresponding portion of a first version of the software program, wherein:
        the first version of the software program was written by a first author;
        the portion of the second version of the software program includes revisions to the corresponding portion of the first version of the software program, the revisions including segments of source code in the second version of the software program that have changed relative to corresponding segments of source code in the first version of the software program; and
        the revisions to the corresponding portion of the first version of the software program were written by a second author;
    for a respective segment of source code in the second version of the software program that has changed relative to a corresponding segment of source code in the first version of the software program:
        determine a first attribution value for the first author based in part on one or more differences between the respective segment of source code in the second version of the software program and the corresponding segment of source code in the first version of the software program; and
        determine an attribution value for the second author based in part on the one or more differences between the respective segment of source code in the second version of the software program and the corresponding segment of source code in the first version of the software program, wherein:
            determining the first attribution value for the first author and determining the attribution value for the second author exclude one or more differences between comments in the respective segment of source code in the second version of the software program and the corresponding segment of source code in the first version of the software program, and
            the attribution values for the first author and the second author indicate respective relative degrees of contribution by the first author and the second author for the respective segment; and
    display or send instructions for displaying the respective segment of source code in the portion of the second version of the software program that has changed, comprising:
        for each line of the respective segment of source code in the portion of the second version of the software program that has changed, displaying or sending instructions for displaying a first indicium of the first attribution value for the first author and an indicium of the attribution value for the second author concurrently with each line within the respective segment of source code in the portion of the second version of the software program that has changed, wherein the first attribution value for the first author and the attribution value for the second author are determined based on degrees of contribution from the first author and the second author respectively to the respective segment of source code as a whole in the portion of the second version of the software program.

2. The computer readable storage medium of claim 1, wherein the comparison identifies the segments of source code in the second version of the software program that have changed relative to corresponding segments of source code in the first version of the software program.

3. The computer readable storage medium of claim 1, including instructions, which, when executed by the electronic device with one or more processors, cause the electronic device to:
    prior to accessing the comparison, identify the segments of source code in the second version of the software program that have changed relative to corresponding segments of source code in the first version of the software program.

4. The computer readable storage medium of claim 1, including instructions, which, when executed by the electronic device with one or more processors, cause the electronic device to:
    prior to accessing the comparison, identify one or more differences between the segments of source code in the portion of the second version of the software program that have changed relative to corresponding segments of source code in the first version of the software program.

5. The computer readable storage medium of claim 1, including instructions, which, when executed by the electronic device with one or more processors, cause the electronic device to:
for each respective segment of source code in the portion of the second version of the software program that has changed relative to a corresponding segment of source code in the first version of the software program:
determine an attribution value for the first author based in part on one or more differences between the respective segment of source code in the second version of the software program and the corresponding segment of source code in the first version of the software program; and
determine an attribution value for the second author based in part on one or more differences between the respective segment of source code in the second version of the software program and the corresponding segment of source code in the first version of the software program.

6. The computer readable storage medium of claim 5, including instructions, which, when executed by the electronic device with one or more processors, cause the electronic device to:
display or send instructions for displaying at least some of the second version of the software program such that, for each respective segment of source code in the portion of the second version of the software program that has changed, the first attribution value for the first author and the attribution value for the second author are concurrently displayed with the respective segment of source code in the second version of the software program.

7. The computer readable storage medium of claim 1, including instructions, which, when executed by the electronic device with one or more processors, cause the electronic device to:
determine an attribution value for the first author based in part on one or more differences between the respective segment of source code in the second version of the software program and the corresponding segment of source code in the first version of the software program for each line of source code in the respective segment of source code in the second version of the software program; and
determine an attribution value for the second author based in part on one or more differences between the respective segment of source code in the second version of the software program and the corresponding segment of source code in the first version of the software program for each line of source code in the respective segment of source code in the second version of the software program.

8. The computer readable storage medium of claim 1, including instructions, which, when executed by the electronic device with one or more processors, cause the electronic device to:
after determining the attribution value for the first author and the attribution value for the second author, assign the attribution value for the first author and the attribution value for the second author to each line of source code in the respective segment of source code in the portion of the second version of the software program.

9. The computer readable storage medium of claim 1, wherein:
for the respective segment of source code in the second version of the software program that has changed, at least one of the indicium of the attribution value for the first author and the indicium of the attribution value for the second author are displayed with each line of source code in the respective segment of source code in the second version of the software program.

10. The computer readable storage medium of claim 1, including instructions, which, when executed by the electronic device with one or more processors, cause the electronic device to:
access a comparison of at least a portion of a third version of the software program to a corresponding portion of the second version of the software program, wherein:
the portion of the third version of the software program includes revisions to the corresponding portion of the second version of the software program, the revisions including segments of source code in the third version of the software program that have changed relative to corresponding segments of source code in the second version of the software program; and
the revisions to the corresponding portion of the second version of the software program were written by a third author;
for a respective segment of source code in the third version of the software program that has changed relative to a corresponding segment of source code in the second version of the software program:
determine an attribution value for the first author based in part on one or more differences between the respective segment of source code in the third version of the software program and the corresponding segment of source code in the second version of the software program;
determine an attribution value for the second author based in part on one or more differences between the respective segment of source code in the third version of the software program and the corresponding segment of source code in the second version of the software program;
determine an attribution value for the third author based in part on one or more differences between the respective segment of source code in the third version of the software program and the corresponding segment of source code in the second version of the software program; and
display or send instructions for displaying at least some of the third version of the software program such that, for the respective segment of source code in the third version of the software program that has changed, an indicium of the attribution value for the first author, an indicium of the attribution value for the second author, and/or an indicium of the attribution value for the third author are displayed with the respective segment of source code in the third version of the software program.

11. The computer readable storage medium of claim 1, wherein the first version of the software program corresponds to a first commit of the software program in a revision control system, and the second version of the software program corresponds to a subsequent commit of the software program in the revision control system.

12. The computer readable storage medium of claim 1, wherein the first author is a creator of all of the lines of source code of the first version of the software program.

13. The computer readable storage medium of claim 1, wherein the respective segment of source code in the second version of the software program corresponds to one or more lines of source code in the second version of the software program that are identified by a file comparison program as corresponding to one or more lines of source code in the first version of the software program.

14. The computer readable storage medium of claim 13, wherein the respective segment of source code in the second version of the software program includes a same number of lines of source code as the corresponding segment of source code in the first version of the software program.

15. The computer readable storage medium of claim 1, wherein the attribution value for the second author for the respective segment of source code in the portion of the second version of the software program is based at least partially on one or more of:
   a number of lines of source code added, by the second author, to the respective segment of source code in the portion of the second version of the software program;
   a number of lines of source code removed, by the second author, from the corresponding segment of source code in the first version of the software program;
   a number of tokens added, by the second author, to the respective segment of source code in the portion of the second version of the software program;
   a number of tokens removed, by the second author, from the corresponding segment of source code in the first version of the software program;
   a total number of lines in the respective segment of source code in the portion of the second version of the software program;
   a total number of lines in the corresponding segment of source code in the first version of the software program;
   a total number of tokens in the respective segment of source code in the portion of the second version of the software program; or
   a total number of tokens in the corresponding segment of source code in the first version of the software program.

16. The computer readable storage medium of claim 1, wherein an indicium of an author with a highest attribution value for the respective segment is displayed with the respective segment of source code in the second version of the software program.

17. An electronic device, comprising:
   one or more processors; and
   memory, the memory storing one or more programs that are configured to be executed by the one or more processors, the one or more programs including instructions for:
      accessing a comparison of at least a portion of a second version of a software program to a corresponding portion of a first version of the software program, wherein:
         the first version of the software program was written by a first author;
         the portion of the second version of the software program includes revisions to the corresponding portion of the first version of the software program, the revisions including segments of source code in the second version of the software program that have changed relative to corresponding segments of source code in the first version of the software program; and
         the revisions to the corresponding portion of the first version of the software program were written by a second author;
      for a respective segment of source code in the second version of the software program that has changed relative to a corresponding segment of source code in the first version of the software program:
         determining an attribution value for the first author based in part on one or more differences between the respective segment of source code in the second version of the software program and the corresponding segment of source code in the first version of the software program; and
         determining an attribution value for the second author based in part on the one or more differences between the respective segment of source code in the second version of the software program and the corresponding segment of source code in the first version of the software program, wherein:
            determining the attribution value for the first author and determining the attribution value for the second author exclude one or more differences between comments in the respective segment of source code in the second version of the software program and the corresponding segment of source code in the first version of the software program, and
            the attribution values for the first author and the second author indicate respective relative degrees of contribution by the first author and the second author for the respective segment; and
         displaying or sending instructions for displaying the respective segment of source code in the portion of the second version of the software program that has changed, comprising:
            for each line of the respective segment of source code in the portion of the second version of the software program that has changed, displaying or sending instructions for displaying an indicium of the attribution value for the first author and an indicium of the attribution value for the second author concurrently with each line within the respective segment of source code in the portion of the second version of the software program that has changed, wherein the attribution value for the first author and the attribution value for the second author are determined based on degrees of contribution from the first author and the second author respectively to the respective segment of source code as a whole in the portion of the second version of the software program.

18. A method, comprising:
at an electronic device with one or more processors and memory:
   accessing a comparison of at least a portion of a second version of a software program to a corresponding portion of a first version of the software program, wherein:
      the first version of the software program was written by a first author;
      the portion of the second version of the software program includes revisions to the corresponding portion of the first version of the software program, the revisions including segments of source code in the second version of the software program that have changed relative to corresponding segments of source code in the first version of the software program; and
      the revisions to the corresponding portion of the first version of the software program were written by a second author;
   for a respective segment of source code in the second version of the software program that has changed relative to a corresponding segment of source code in the first version of the software program:
  determining an attribution value for the first author based in part on one or more differences between the respective segment of source code in the second version of the software program and the corresponding segment of source code in the first version of the software program; and
  determining an attribution value for the second author based in part on the one or more differences between the respective segment of source code in the second version of the software program and the corresponding segment of source code in the first version of the software program, wherein:
    determining the attribution value for the first author and determining the attribution value for the second author exclude one or more differences between comments in the respective segment of source code in the second version of the software program and the corresponding segment of source code in the first version of the software program, and
    the attribution values for the first author and the second author indicate respective relative degrees of contribution by the first author and the second author for the respective segment; and
  displaying or sending instructions for displaying the respective segment of source code in the portion of the second version of the software program that has changed, comprising:
    for each line of the respective segment of source code in the portion of the second version of the software program that has changed, displaying or sending instructions for displaying an indicium of the attribution value for the first author and an indicium of the attribution value for the second author concurrently with each line within the respective segment of source code in the portion of the second version of the software program that has changed, wherein the attribution value for the first author and the attribution value for the second author are determined based on degrees of contribution from the first author and the second author respectively to the respective segment of source code as a whole in the portion of the second version of the software program.

19. The non-transitory computer readable storage medium of claim 1, wherein the first indicium of the first attribution value for the first author and the indicium of the attribution value for the second author are respective quantitative values representing quantifiable contributions from the first author and the second author respectively to the respective segment of source code in the portion of the second version of the software program that has changed as a whole.

20. The non-transitory computer readable storage medium of claim 1, including instructions, which, when executed by the electronic device with one or more processors, cause the electronic device to:
  determine a second attribute value for the first author for the corresponding segment of source code in the first version of the software program; and
  display or send instructions for displaying, in a first area of a screen, the corresponding segment of the source code in the first version of the software program concurrently with a second indicium of the second attribution value for the first author, the second indicium of the second attribution value for the first author displayed for each line of the corresponding segment of the source code in the first version of the software program;
  wherein the respective segment of source code in the portion of the second version of the software program is displayed, in a second area of the screen, concurrently with the first indicium of the first attribution value for the first author and the indicium of the attribution value for the second author for each line of the respective segment of source code in the portion of the second version of the software program that has changed, and
  wherein the first area and the second area are displayed in a side-by-side view on the screen.

* * * * *